(12) United States Patent
Larsson et al.

(10) Patent No.: US 12,520,323 B2
(45) Date of Patent: *Jan. 6, 2026

(54) SCHEDULING IN LICENSE ASSISTED ACCESS

(71) Applicant: Telefonaktiebolaget LM Ericsson (publ), Stockholm (SE)

(72) Inventors: Daniel Larsson, Lund (SE); Jung-Fu Cheng, Fremont, CA (US); Sorour Falahati, Stockholm (SE); Havish Koorapaty, Saratoga, CA (US); Amitav Mukherjee, Fremont, CA (US); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 331 days.

This patent is subject to a terminal disclaimer.

(21) Appl. No.: 17/985,300

(22) Filed: Nov. 11, 2022

(65) Prior Publication Data
US 2023/0067198 A1    Mar. 2, 2023

Related U.S. Application Data

(63) Continuation of application No. 16/750,555, filed on Jan. 23, 2020, now Pat. No. 11,523,424, which is a
(Continued)

(51) Int. Cl.
*H04W 4/00* (2018.01)
*H04W 72/23* (2023.01)
(Continued)

(52) U.S. Cl.
CPC ......... *H04W 72/23* (2023.01); *H04W 74/006* (2013.01); *H04W 74/0808* (2013.01); *H04W 84/042* (2013.01); *H04W 88/08* (2013.01)

(58) Field of Classification Search
None
See application file for complete search history.

(56) References Cited

U.S. PATENT DOCUMENTS

| 8,774,209 B2 | 7/2014 | Sadek et al. |
| 9,397,801 B2 | 7/2016 | Kim et al. |
(Continued)

FOREIGN PATENT DOCUMENTS

| JP | 2014508468 A | 4/2014 |
| WO | 2012109195 A2 | 8/2012 |
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.
(Continued)

*Primary Examiner* — Bob A Phunkulh
(74) *Attorney, Agent, or Firm* — Murphy, Bilak & Homiller, PLLC

(57) ABSTRACT

In one aspect, a wireless device receives a scheduling grant and a grant confirmation signal indicating that a network node has performed a CCA on a carrier and is releasing the carrier for the wireless device. An uplink message is transmitted on the carrier without performing a CCA on the carrier. In another aspect, a wireless device is connected to a first cell and a second cell configured on a carrier requiring an LBT protocol. The wireless device receives configuration messages indicating that downlink transmissions on the second cell are to be scheduled. This can mean self-scheduling for downlink on the second cell and cross-carrier scheduling for uplink on the first cell. The wireless device receives a scheduling grant in the first cell and performs a
(Continued)

CCA in the second cell. The wireless device then transmits an uplink message responsive to success of the CCA.

16 Claims, 30 Drawing Sheets

Related U.S. Application Data continuation of application No. 15/029,521, filed as application No. PCT/SE2016/050218 on Mar. 17, 2016, now Pat. No. 10,582,532.

(60) Provisional application No. 62/134,303, filed on Mar. 17, 2015.

(51) Int. Cl.
| | | |
|---|---|---|
| *H04W 74/00* | (2009.01) | |
| *H04W 74/0808* | (2024.01) | |
| *H04W 84/04* | (2009.01) | |
| *H04W 88/08* | (2009.01) | |

(56) References Cited

U.S. PATENT DOCUMENTS

| | | | |
|---|---|---|---|
| 9,893,852 | B2 | 2/2018 | Yerramalli et al. |
| 9,949,292 | B2 | 4/2018 | Bhushan et al. |
| 10,582,532 | B2 | 3/2020 | Larsson et al. |
| 2011/0128895 | A1 | 6/2011 | Sadek et al. |
| 2014/0098774 | A1 | 4/2014 | Gao et al. |
| 2014/0140251 | A1 | 5/2014 | Pan et al. |
| 2014/0204818 | A1 | 7/2014 | Trainin et al. |
| 2014/0342745 | A1 | 11/2014 | Bhushan et al. |
| 2014/0362780 | A1 | 12/2014 | Malladi et al. |
| 2015/0049708 | A1 | 2/2015 | Damnjanovic et al. |
| 2015/0049709 | A1 | 2/2015 | Damnjanovic et al. |
| 2015/0049715 | A1 | 2/2015 | Yerramalli et al. |
| 2015/0055589 | A1 | 2/2015 | Yerramalli et al. |
| 2015/0071060 | A1 | 3/2015 | Bhushan et al. |
| 2015/0071220 | A1 | 3/2015 | Luo et al. |
| 2015/0092703 | A1 | 4/2015 | Xu et al. |
| 2015/0103777 | A1 | 4/2015 | Chen et al. |
| 2015/0110012 | A1 | 4/2015 | Bhushan et al. |
| 2015/0172950 | A1 | 6/2015 | Chen et al. |
| 2015/0173056 | A1 | 6/2015 | Yerramalli et al. |
| 2015/0215929 | A1 | 7/2015 | Damnjanovic et al. |
| 2015/0237548 | A1 | 8/2015 | Luo et al. |
| 2015/0256305 | A1 | 9/2015 | Yerramalli et al. |
| 2015/0271847 | A1 | 9/2015 | Luo et al. |
| 2015/0341880 | A1 | 11/2015 | Seok |
| 2015/0341921 | A1 | 11/2015 | Chen et al. |
| 2016/0073344 | A1 | 3/2016 | Vutukuri et al. |
| 2016/0374082 | A1 | 12/2016 | Nguyen et al. |
| 2017/0118728 | A1 | 4/2017 | Harada et al. |
| 2017/0346606 | A1 | 11/2017 | Li et al. |
| 2018/0007643 | A1 | 1/2018 | Tiirola et al. |
| 2018/0175975 | A1 | 6/2018 | Um et al. |
| 2018/0176956 | A1 | 6/2018 | Koutsimanis et al. |

FOREIGN PATENT DOCUMENTS

| | | |
|---|---|---|
| WO | 2012162889 A1 | 12/2012 |
| WO | 2013169003 A1 | 11/2013 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.

Unknown, Author, "Analysis on potential issues and solutions for LAA UL transmission", ZTE, 3GPP TSG RAN WG1 Meeting #80, R1-150156, Athens, Greece, Feb. 9-13, 2015, 1-6.

Unknown, Author, "Analysis on the support of UL transmission for LAA", 3GPP TSG RAN WG1 meeting #80, R1-150048, Athens, Greece, Feb. 9-13, 2015, 1-4.

Unknown, Author, "Broadband Radio Access Networks (BRAN); 5 GHz high performance RLAN; Harmonized EN covering the essential requirements of article 3.2 of the R&TTE Directive", ETSI EN 301 893 V1.7.1, Jun. 2012, 1-91.

Unknown, Author, "Design of LAA UL transmission", Fujitsu, 3GPP TSG RAN WG1 Meeting #80, R1-150186, Athens, Greece, Feb. 9-13, 2015, 1-3.

Unknown, Author, "On Reservation Signal", ZTE, 3GPP TSG RAN WG1 Meeting #80, R1-150155, Athens, Greece, Feb. 9-13, 2015, 1-6.

Unknown, Author, "On the LAA uplink: scheduling, LST, and HARQ", Intel Corporation, 3GPP TSG RAN WG1 Meeting #80, R1-150507, Athens, Greece, Feb. 9-13, 2015, 1-4.

1200

TRANSMIT, TO A WIRELESS DEVICE, CONFIGURATION MESSAGES INDICATING THAT DOWNLINK TRANSMISSIONS ON THE SECOND CELL ARE TO BE SCHEDULED (USING SELF-SCHEDULING ON THE SECOND CELL, AND THAT UPLINK TRANSMISSIONS ON THE SECOND CELL ARE TO BE SCHEDULED USING CROSS-CARRIER SCHEDULING ON THE FIRST CELL)
1202

TRANSMIT A SCHEDULING GRANT TO THE WIRELESS DEVICE IN THE FIRST CELL
1204

RECEIVE AN UPLINK MESSAGE FROM THE WIRELESS DEVICE IN THE SECOND CELL, ACCORDING TO THE TRANSMITTED SCHEDULING GRANT
1206

*FIG. 12*

SCHEDULING IN LICENSE ASSISTED ACCESS

TECHNICAL FIELD

This disclosure pertains to scheduling in wireless communication networks, and more particularly to scheduling in wireless networks in which data transmissions in unlicensed spectrum are aggregated with data transmissions in licensed spectrum.

BACKGROUND

The 3GPP initiative "Licensed Assisted Access" (LAA) intends to allow Long Term Evolution (LTE) equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum may have to be shared with other radios of similar or dissimilar wireless technologies, a so called listen-before-talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

In Europe, the LBT procedure is under the scope of EN 301.893 regulation. For LAA to operate in the 5 GHz spectrum, the LAA LBT procedure shall conform to requirements and minimum behaviors set forth in EN 301.893. However, additional system designs and steps are needed to ensure coexistence of Wi-Fi and LAA with EN 301.893 LBT procedures.

U.S. Pat. No. 8,774,209 B2, titled "Apparatus and method for spectrum sharing using listen-before-talk with quiet periods," discloses a mechanism where LBT is adopted by frame-based orthogonal frequency-division multiplexing (OFDM) systems to determine whether the channel is free prior to transmission. A maximum transmission duration timer is used to limit the duration of a transmission burst, and it is followed by a quiet period. However, it is recognized herein that a fairer coexistence with other radio access technologies such as Wi-Fi is needed, while also satisfying EN 301.893 regulations.

LTE uses OFDM in the downlink and discrete Fourier transform (DFT)-spread OFDM, also referred to as single-carrier frequency-division multiple access (FDMA), in the uplink. The basic LTE downlink physical resource can thus be seen as a time-frequency grid, as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, for example, the control information. A downlink subframe with CFI=3 OFDM symbols as control is illustrated in FIG. 3.

From LTE Rel-11 onwards, the above described resource assignments can also be scheduled on the enhanced Physical Downlink Control Channel (EPDCCH). For Rel-8 to Rel-10, only Physical Downlink Control Channel (PDCCH) is available.

The reference symbols shown in FIG. 3 are the cell specific reference symbols (CRS) and are used to support multiple functions including fine time and frequency synchronization and channel estimation for certain transmission modes. The PDCCH/EPDCCH is used to carry downlink control information (DCI) such as scheduling decisions and power-control commands. More specifically, the DCI includes downlink scheduling assignments, including PDSCH resource indication, transport format, hybrid-ARQ information and control information related to spatial multiplexing (if applicable). A downlink scheduling assignment also includes a command for power control of the physical uplink control channel (PUCCH) used for transmission of hybrid-ARQ acknowledgements in response to downlink scheduling assignments. The DCI also includes uplink scheduling grants, including PUSCH resource indication, transport format, and hybrid-ARQ-related information. An uplink scheduling grant also includes a command for power control of the PUSCH. The DCI also includes power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, it should be possible to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

In LTE, the uplink (UL) transmission scheduling command is transmitted from the eNB to the user equipment (UE). There is a fixed delay between the time the scheduling command is transmitted and the time the UE transmits the UL signal specified in the standard. This delay is provisioned to allow the UE time to decode the PDCCH/EPDCCH and prepare the UL signal for transmission. For a frequency division duplex (FDD) serving cell, this UL grant delay is 4 ms. For a time division duplex (TDD) serving cell, this UL grant can be greater than 4 ms.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CCs, where the CCs have, or at least the possibility to have, the same structure as a Rel-8 carrier. An example of CA is illustrated in FIG. 4. A CA-capable UE is assigned a primary cell (PCell) which is always activated, and one or more secondary cells (SCells) which may be activated or deactivated dynamically.

The number of aggregated CCs, as well as the bandwidth of the individual CC, may be different for uplink and downlink. A symmetric configuration refers to the case where the number of CCs in downlink and uplink is the same, whereas an asymmetric configuration refers to case where the number of CCs is different. It is important to note that the number of CCs configured in a cell may be different from the number of CCs seen by a terminal. A terminal may for example support more downlink CCs than uplink CCs, even though the cell is configured with the same number of uplink and downlink CCs.

In addition, a key feature of carrier aggregation is the ability to perform cross-carrier scheduling. This mechanism allows an (E)PDCCH on one CC to schedule data transmissions on another CC by means of a 3-bit CIF inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

In LTE, the scheduling information of DL and UL transmission on the PCell is transmitted on the PCell using PDCCH or EPDCCH. This basic scheduling mechanism is referred to as the self-scheduling method in LTE. For a SCell, two scheduling mechanisms are supported: SCell self-scheduling and SCell cross-carrier scheduling. For SCell self-scheduling, as in the case of the PCell, the scheduling information of DL and UL transmission on the SCell is transmitted on the same SCell itself using PDCCH or EPDCCH. For SCell cross-carrier scheduling, the network can also configure a SCell via higher layer signaling to use a cross-carrier scheduling mechanism. In this approach, the scheduling information of DL and UL transmission on a SCell is transmitted on a second cell using PDCCH or EPDCCH. Said second cell can be the PCell or another SCell.

Note, for LTE, the DL and UL scheduling approaches are configured together. That is, the DL and UL transmissions of a cell are either both self-scheduling or both cross-carrier scheduling.

Wireless Local Area Network

In typical deployments of wireless local area networks (WLANs), carrier sense multiple access with collision avoidance (CSMA/CA) is used for medium access. This means that the channel is sensed to perform a clear channel assessment (CCA), and a transmission is initiated only if the channel is declared as Idle. In the event that the channel is declared as Busy, the transmission is deferred until the channel is deemed to be Idle. When the range of several APs using the same frequency overlap, this means that all transmissions related to one AP might be deferred in the event that a transmission on the same frequency to or from another AP that is within range can be detected. Effectively, this means that if several APs are within range, they will have to share the channel in time, and the throughput for the individual APs may be severely degraded. A general illustration of the LBT mechanism is shown in FIG. 5.

After a Wi-Fi station A transmits a data frame to a station B, station B shall transmit the ACK frame back to station A with a delay of 16 μs. Such an ACK frame is transmitted by station B without performing a LBT operation. To prevent another station interfering with such an ACK frame transmission, a station shall defer for a duration of 34 μs (referred to as distributed coordinated function (DCF) inter-frame space, or DIFS) after the channel is observed to be occupied before assessing again whether the channel is occupied.

Therefore, a station that wishes to transmit first performs a CCA by sensing the medium for a fixed duration DIFS. If the medium is idle, then the station assumes that it may take ownership of the medium and begin a frame exchange sequence. If the medium is busy, the station waits for the medium to go idle, defers for DIFS, and waits for a further random backoff period.

To further prevent a station from occupying the channel continuously and thereby prevent other stations from accessing the channel, it is required for a station wishing to transmit again after a transmission is completed to perform a random backoff.

The point coordination function (PCF) inter-frame space (PIFS) is used to gain priority access to the medium, and is shorter than the DIFS duration. Among other cases, it can be used by stations (STAs) operating under PCF, to transmit Beacon Frames with priority. At the nominal beginning of each Contention-Free Period (CFP), the point coordinator (PC) shall sense the medium. When the medium is determined to be idle for one PIFS period (generally 25 μs), the PC shall transmit a Beacon frame containing the CF Parameter Set element and a delivery traffic indication message element.

For a device not utilizing the Wi-Fi protocol, EN 301.893, v. 1.7.1 provides the following requirements and minimum behavior for the load-based clear channel assessment. As a first requirement, before a transmission or a burst of transmissions on an Operating Channel, the equipment shall perform a CCA check using "energy detect". The equipment shall observe the Operating Channel(s) for the duration of the CCA observation time, which shall be not less than 20 μs. The CCA observation time used by the equipment shall be declared by the manufacturer. The Operating Channel shall be considered occupied if the energy level in the channel exceeds the threshold corresponding to a power level. If the equipment finds the channel to be clear, it may transmit immediately.

As a second requirement, if the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer. The counter is decremented every time a CCA slot is considered to be "unoccupied". When the counter reaches zero, the equipment may transmit. The equipment is allowed to continue Short Control Signalling Transmissions on this channel providing it complies with the requirements in clause 4.9.2.3. For equipment having simultaneous transmissions on multiple (adjacent or non-adjacent) operating channels, the equipment is allowed to continue transmissions on other Operating Channels providing the CCA check did not detect any signals on those channels.

As a third requirement, the total time that an equipment makes use of an Operating Channel is the Maximum Channel Occupancy Time which shall be less than (13/32)×q ms, with q as defined for the second requirement, after which the device shall perform the Extended CCA.

As a fourth requirement, the equipment, upon correct reception of a packet which was intended for this equipment, can skip CCA and immediately proceed with the transmission of management and control frames (e.g. ACK and Block ACK frames). A consecutive sequence of transmissions by the equipment, without it performing a new CCA, shall not exceed the Maximum Channel Occupancy Time as defined for the third requirement. For the purpose of multicast, the ACK transmissions (associated with the same data packet) of the individual devices are allowed to take place in a sequence.

As a fifth requirement, the energy detection threshold for the CCA shall be proportional to the maximum transmit power (PH) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.). An example illustrating the LBT procedure in EN 301.893 is provided in FIG. 6.

Up to now, the spectrum used by LTE is dedicated to LTE. This has the advantage that an LTE system does not need to care about coexistence with other non-3GPP radio access technologies in the same spectrum and spectrum efficiency can be maximized. However, the spectrum allocated to LTE is limited and cannot meet the ever increasing demand for larger throughput from applications/services. Therefore, a new study item has been initiated in 3GPP on extending LTE to exploit unlicensed spectrum in addition to licensed spectrum.

With Licensed-Assisted Access (LAA) to unlicensed spectrum, as shown in FIG. 7, a UE is connected to a PCell in the licensed band and one or more SCells in the unlicensed band. In this application, the secondary cell in unlicensed spectrum is denoted as an LAA secondary cell (LAA SCell). The LAA SCell may operate in DL-only mode or operate with both UL and DL traffic. Furthermore, in future scenarios the LTE nodes may operate in standalone mode in license-exempt channels without assistance from a licensed cell. Unlicensed spectrum can, by definition, be simultaneously used by multiple different technologies. Therefore, LAA as described above needs to consider coexistence with other systems such as IEEE 802.11 (Wi-Fi).

To coexist fairly with the Wi-Fi system, transmission on the SCell shall conform to LBT protocols in order to avoid collisions and causing severe interference to on-going transmissions. This includes both performing LBT before commencing transmissions, and limiting the maximum duration of a single transmission burst. The maximum transmission burst duration is specified by country and region-specific regulations. For example, the maximum burst duration is 4 ms in Japan and 13 ms according to EN 301.893. An example in the context of LAA is shown in FIG. 8 with different examples for the duration of a transmission burst on the LAA SCell constrained by a maximum allowed transmission duration of 4 ms.

There are two possible approaches to support UL transmission on an LAA SCell. In a first approach, the UE follows an LBT protocol to attempt channel access after receiving the UL transmission scheduling command. This is illustrated in an example of 4 ms channel occupancy time system in FIG. 9. That is, the LBT protocol is designed to allow 4 ms DL channel occupancy time and 4 ms UL channel occupancy time. In a second approach, the UE does not follow any LBT protocol to initiate channel access after receiving the UL transmission scheduling command. This is illustrated for an example of 8 ms channel occupancy time system in FIG. 10. In this example, the LBT protocol is designed to allow 8 ms total channel occupancy time between DL and UL transmissions. LBT and CCA are performed by the eNB before the start of DL transmissions.

SUMMARY

There is a need in the art for improved mechanisms for scheduling, for example in cells configured on a carrier where an LBT protocol is required to be used for transmission, and in cells configured on carriers where uplink transmissions should follow a reverse direction grant protocol.

A first problem exists where UL transmissions follow an LBT protocol. Following the current LTE scheduling configuration specs, the DL and UL transmissions on an LAA SCell will both follow either self-scheduling or cross-carrier scheduling. This restriction can severely limit the operation and performance of LAA under certain operation conditions. A congested scenario can arise when there are many nodes contending to access the channel, such as when the LAA system is operating on the same frequency as another Wi-Fi network with many UEs. Suppose there are N nodes, including small cells (such as LAA eNBs or Wi-Fi APs) and UEs, contending for channel access. There is then a 1/N chance that an LAA eNB can obtain the channel access, in which it can transmit the self-scheduling information to schedule UL transmission from its associated UEs. The UEs, upon receiving the UL transmission scheduling command, will try to access the channel following an LBT protocol, which by itself gives the UE a 1/N chance of obtaining the channel. However, the UE's LBT action is contingent on receiving the scheduling command from the eNB, which requires the eNB obtaining the channel in the first place. That is, the net probability of a successful UL transmission is close to $1/N^2$. When there are a large number of nodes operating in the same frequency, this analysis shows the LAA UL operation will not function well.

A second problem occurs when UL transmissions follow a reverse direction grant protocol. In some regions, the maximum allowed channel occupancy time may be very short. For example, the Japanese regulation limits the channel occupancy time to 4 ms. This will prevent the use of reverse direction grant protocol for UL transmission since the UL grant delay is at least 4 ms.

An advantage of some of the proposed solutions is enhanced LAA UL transmission operations. Two operations are proposed to enable better LAA UL transmissions. To address problem 1, scheduling methods for DL transmission and UL transmission can be configured separately. To address problem 2, a reverse direction grant assistance signal is transmitted in the DL to enable UL reverse direction grant protocol operations.

According to some embodiments, a method is performed at a wireless device that is connected to a first cell and a second cell, where the second cell is configured on a carrier where a LBT protocol for transmission is required to be used. The method includes receiving a configuration message indicating that downlink transmissions on the second cell are to be scheduled. Downlink transmissions may be scheduled using self-scheduling on the second cell, and that uplink transmissions on the second cell are to be scheduled using cross-carrier scheduling on the first cell. For self-scheduling, the scheduling command and data are sent on the same cell. With cross-carrier scheduling, the scheduling command and the data are sent on different cells. It is also possible that two separate configuration messages are received, one for the downlink and one for the uplink. The configuration message or messages may be transmitted via radio resource control (RRC) signalling. The method includes receiving a scheduling grant in the first cell. The method also includes, in a subframe occurring a predetermined number of subframes after receiving the scheduling grant, performing a CCA in the second cell. The method includes transmitting an uplink message responsive to success of the CCA.

According to some embodiments, a method performed at a network node that serves a first cell and a second cell, where the second cell is configured on a carrier where an LBT protocol for transmission is required to be used, includes transmitting, to a wireless device, one or more configuration messages indicating that downlink transmissions on the second cell are to be scheduled. Downlink transmissions may be scheduled using self-scheduling on the second cell, and that uplink transmissions on the second cell are to be scheduled using cross-carrier scheduling on the first cell. It is equally possible to transmit two separate configuration messages, one for the downlink transmission and one for the uplink transmissions. Further, the method includes transmitting a scheduling grant to the wireless device in the first cell. Advantageously, in the first cell, it is not required to use LBT. For instance, the first cell may be operating on LTE licensed spectrum. Thus, the network node may transmit the scheduling grant without first performing a CCA. Subsequent to transmitting the scheduling grant, the method includes receiving an uplink message from the wireless device in the second cell according to the transmitted scheduling grant.

According to some embodiments, a method performed at a network node serving a first cell and a second cell, where the second cell is configured on a carrier where an LBT protocol for transmission is required to be used, includes transmitting, to a wireless device, one or more configuration messages indicating that downlink transmissions on the second cell are to be scheduled using self-scheduling on the second cell, and that uplink transmissions on the second cell are to be scheduled using cross-carrier scheduling on the first cell. The method also includes transmitting a scheduling grant to the wireless device in the first cell and receiving an uplink message from the wireless device in the second cell, according to the transmitted scheduling grant.

According to some embodiments, a method performed at a wireless device connected to a cell operated by a network node (e.g., base station), where the cell is configured on a carrier where an LBT protocol for transmission is required to be used, includes receiving a scheduling grant from the network node. The method also includes receiving, from the network node, a grant confirmation signal indicating that the network node has performed a CCA on the carrier and is releasing the carrier for the wireless device. The method further includes responsive to receiving the scheduling grant and the grant confirmation signal, transmitting an uplink message on the carrier without performing a CCA on the carrier.

According to some embodiments, a method performed at a network node serving a cell, where the cell is configured on a carrier where an LBT protocol for transmission is required to be used and where at least one wireless device is connected to the cell, includes transmitting a scheduling grant to a wireless device for the carrier, for a scheduled uplink transmission. The method also includes performing a first CCA for the carrier, prior to a time for the scheduled uplink transmission and, responsive to success of the CCA, transmitting a grant confirmation signal to the wireless device and releasing the carrier for the scheduled uplink transmission.

The method may also be implemented by wireless devices, network nodes, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 12 is a flowchart illustrating a method in a network node for scheduling transmission, according to some embodiments.

DETAILED DESCRIPTION

Although this disclosure refers to "licensed" and "unlicensed" spectrum, it should be noted that this is only an illustrative scenario and should not be construed as limiting. For example, what is referred to in this disclosure as "unlicensed" spectrum could be licensed but still made available for use under certain conditions (for instance, during certain time periods, or when no users that have priority access to the spectrum are present in the cell). This is sometimes referred to as "License Shared Access" or LSA. Moreover, unless otherwise specified herein, it is not essential to the solution whether a certain spectrum is actually "licensed" or not. The solutions may be applicable in general in scenarios where spectrum in a cell is shared with other radio technologies, especially when those technologies employ different protocols for gaining channel access, and/or different protocols for scheduling.

Further, in the context of this disclosure, CCA encompasses any technique for detecting whether the channel is not being used, before a transmission is performed. The assessment may be limited to specific resources, but it may also require CCA to be performed over a wider bandwidth, for example the full bandwidth of a cell. Thus, an LBT protocol, as discussed herein, involves, on a general level, performing a CCA, and then transmitting only when the CCA is successful, that is, transmitting when the channel is declared as not busy (or, equivalently, declared as idle). The CCA may in some cases be performed on behalf of another device. For example, in a "reverse direction grant protocol", a network node (e.g., a base station or Wi-Fi access point) may perform CCA to secure the channel for a subsequent uplink transmission by a wireless device.

In a first embodiment, scheduling methods for DL transmission and UL transmission can be configured separately via higher layer signaling. A non-limiting example of said higher layer signaling is the RRC layer signaling in LTE. For example, DL transmission is configured to follow self-scheduling and UL transmission is configured to follow cross-carrier scheduling. For the LAA use case, if the UL transmission is cross-scheduled from a cell not following LBT protocol (for example, the PCell in the licensed band), the UL transmission attempts will be subject to only one LBT procedure instead of two LBT procedures. For example, in the self-scheduling case where the eNB has to perform LBT before sending the scheduling message, followed by the UE performing an LBT before sending the scheduled data. This embodiment will allow the LAA UL transmission to perform well even in congested scenarios.

Figure 1:
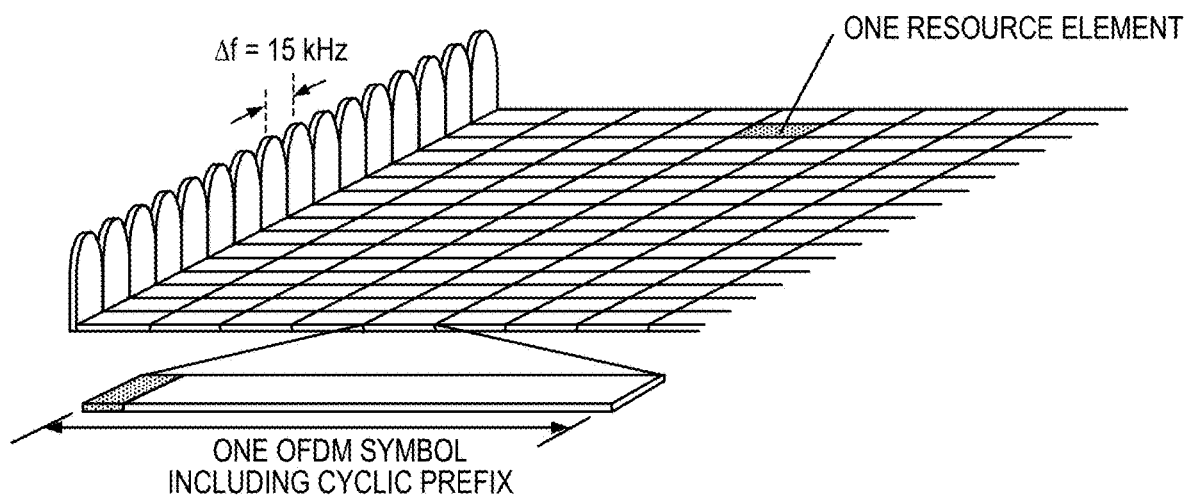
FIG. 1 illustrates the LTE downlink physical resource.
Figure 2:
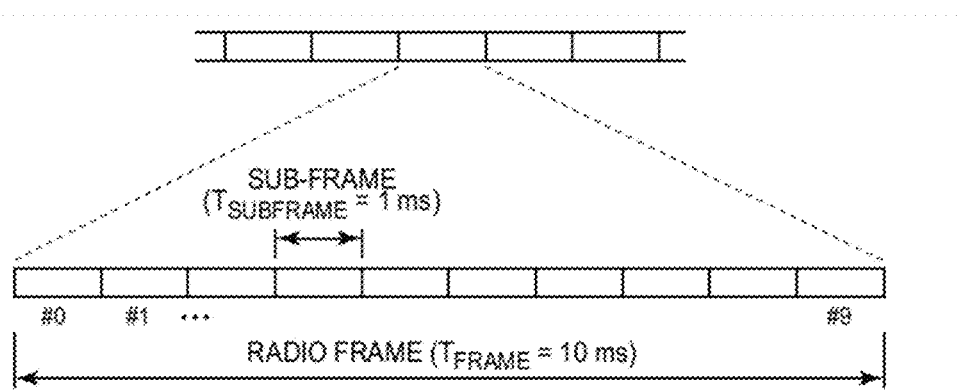
FIG. 2 illustrates an LTE time-domain structure.
Figure 3:
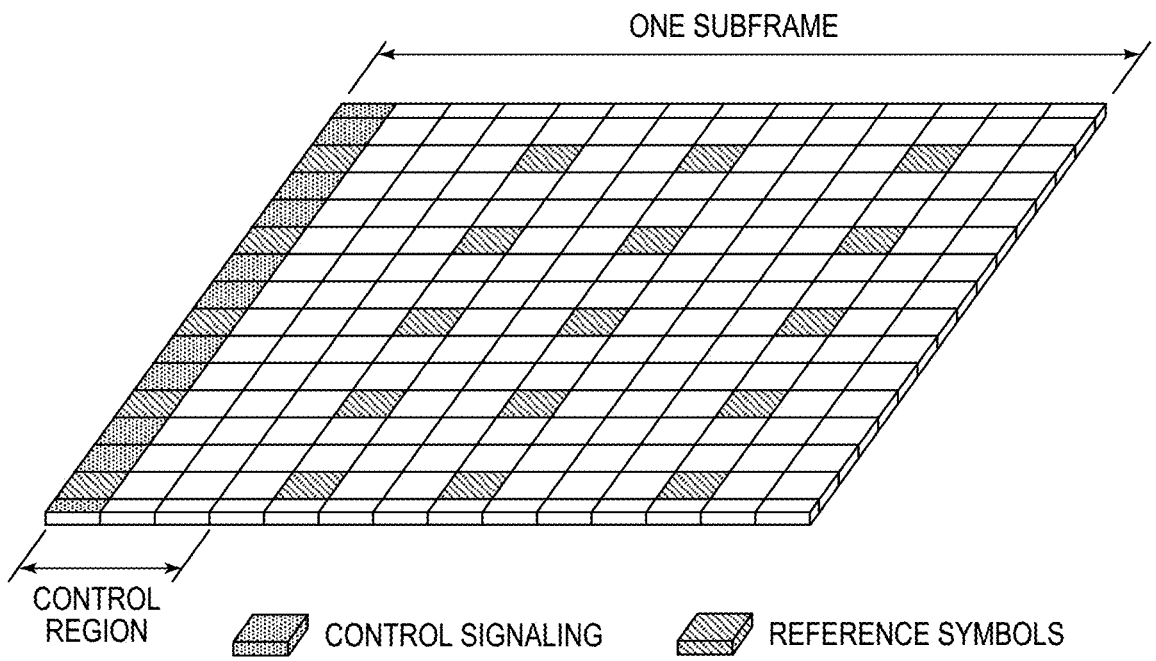
FIG. 3 illustrates a normal downlink subframe.
Figure 4:
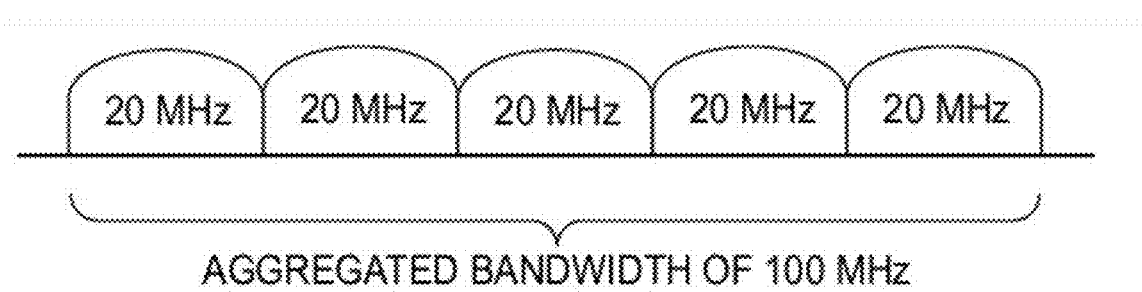
FIG. 4 illustrates carrier aggregation.
Figure 5:
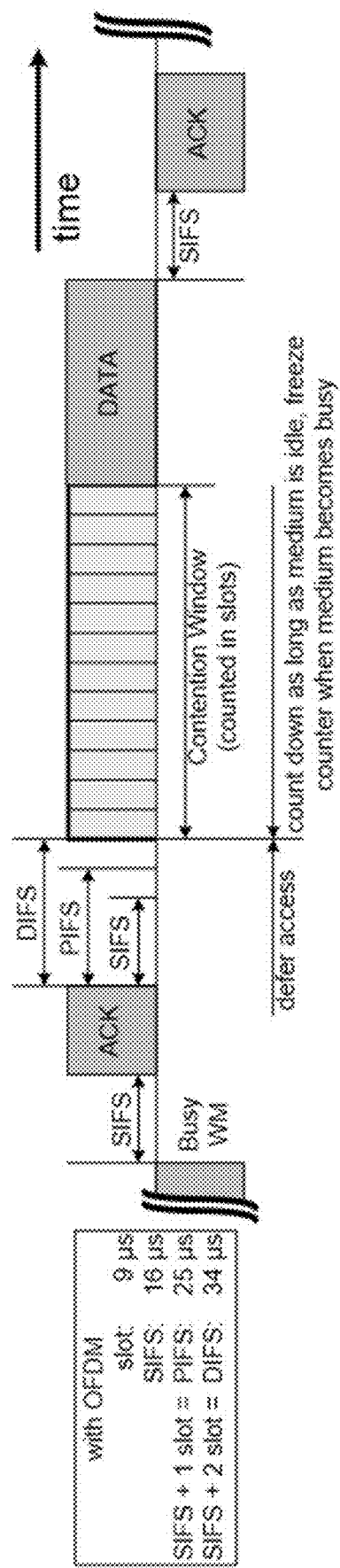
FIG. 5 is a diagram illustrating LBT in Wi-Fi.
Figure 6:
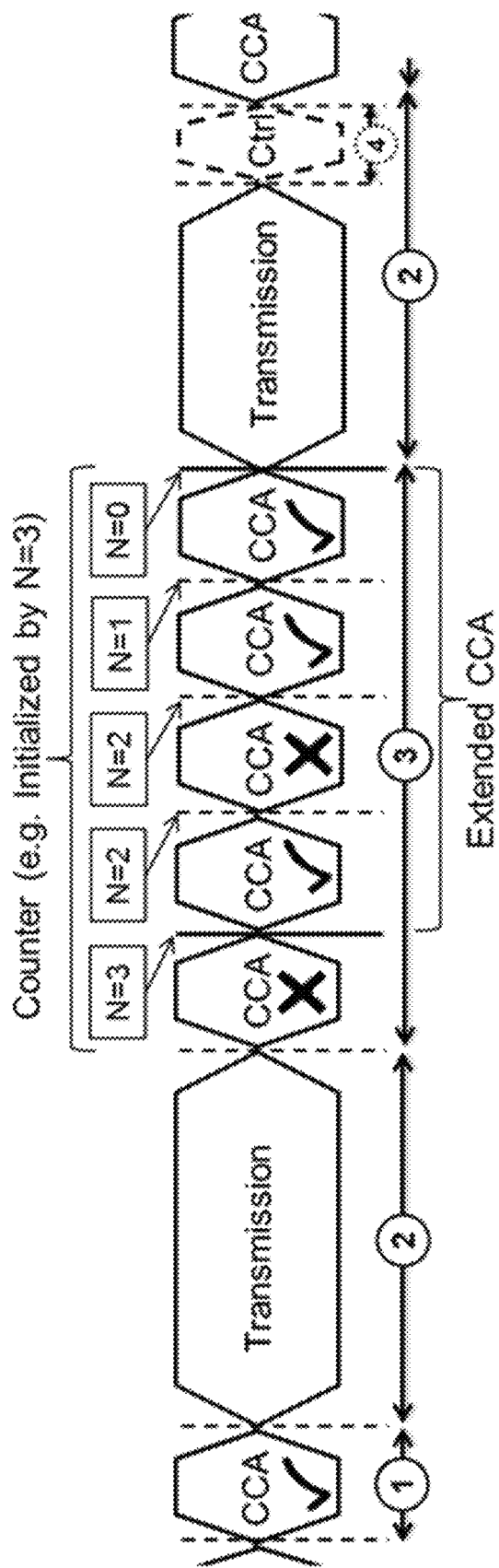
FIG. 6 is a diagram illustrating LBT in EN 301.893.
Figure 7:
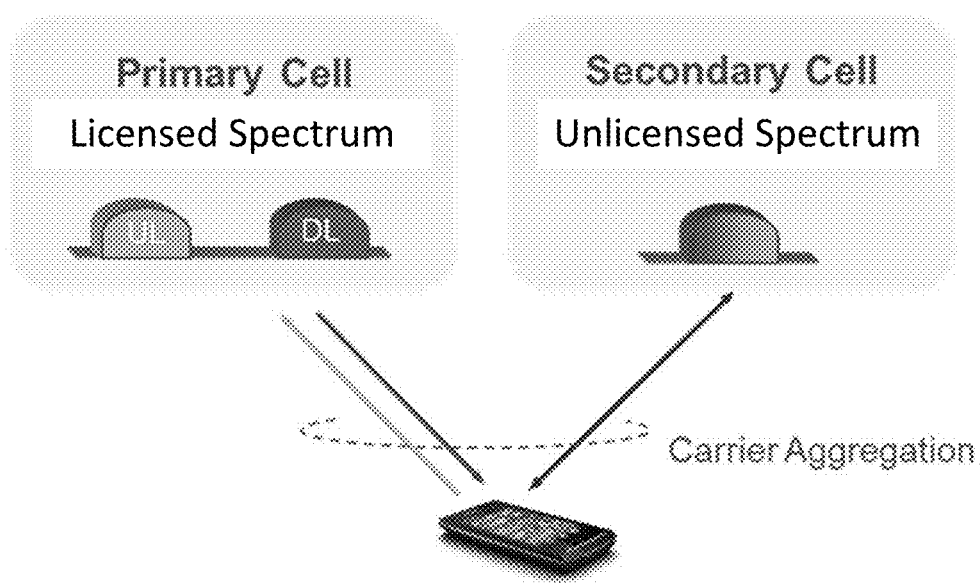
FIG. 7 illustrates a CA-capable UE configured with an LAA SCell.
Figure 8:
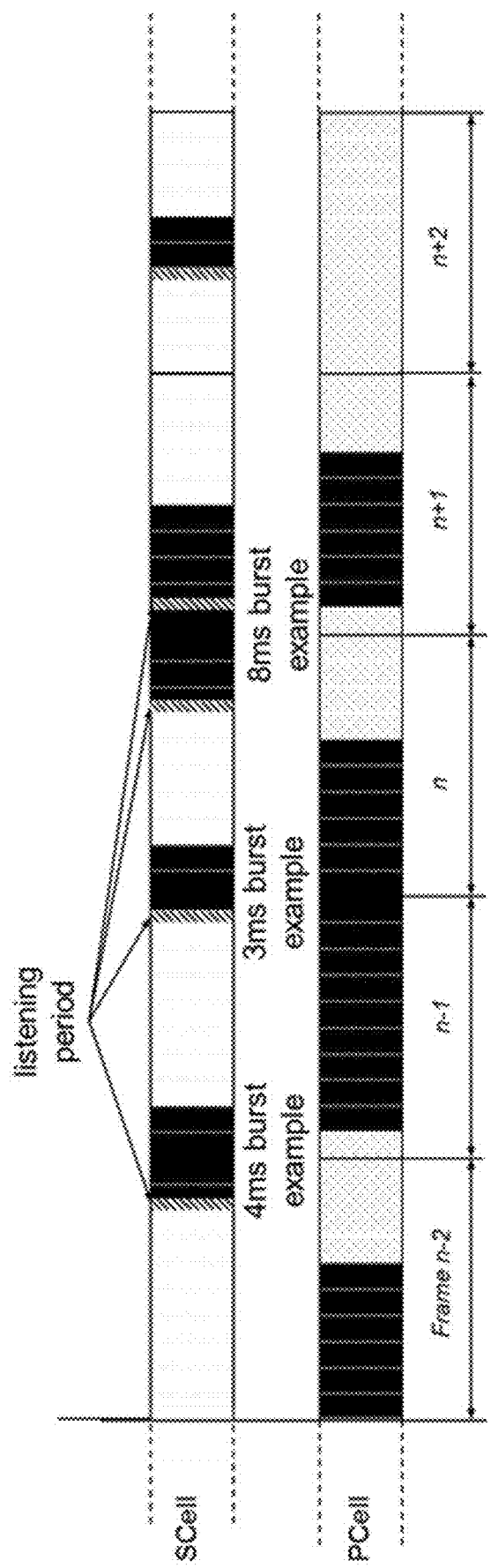
FIG. 8 is a diagram illustrating LAA to unlicensed spectrum using LTE CA and LBT.
Figure 9:
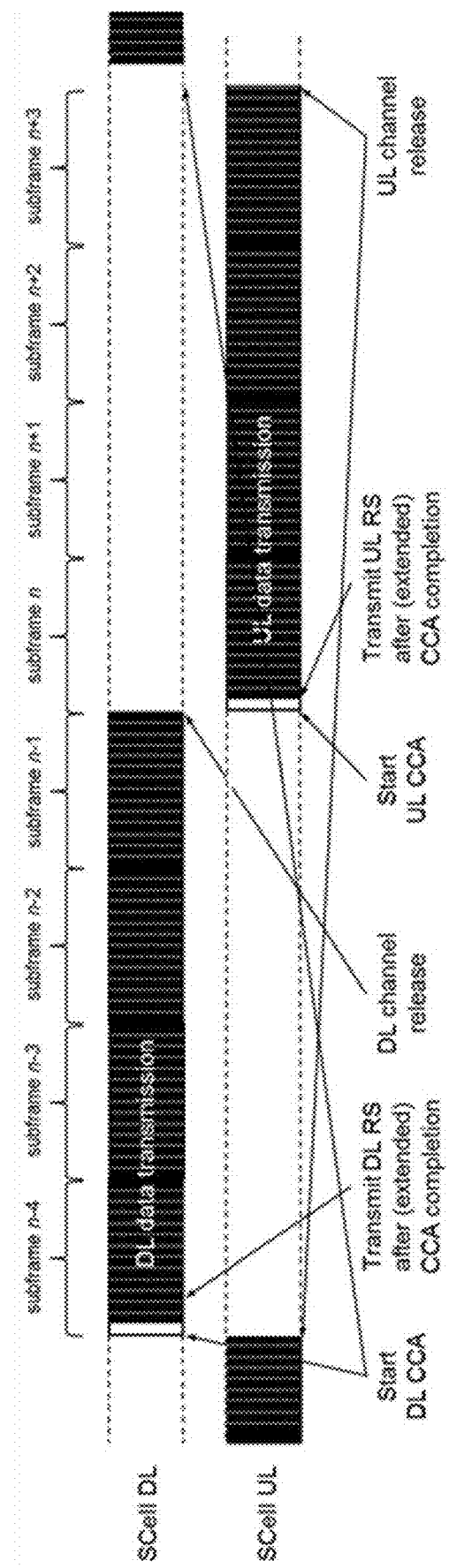
FIG. 9 is a diagram illustrating UL LAA transmissions based on an UL LBT protocol.
Figure 10:
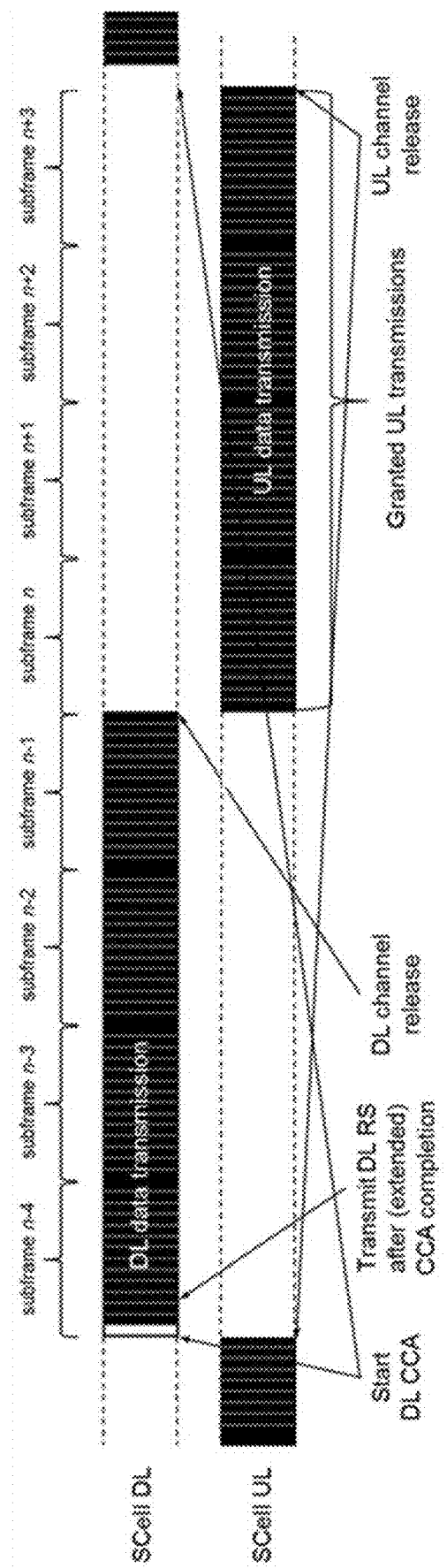
FIG. 10 is a diagram illustrating UL LAA transmissions based on a reverse direction grant protocol.
Figure 11:
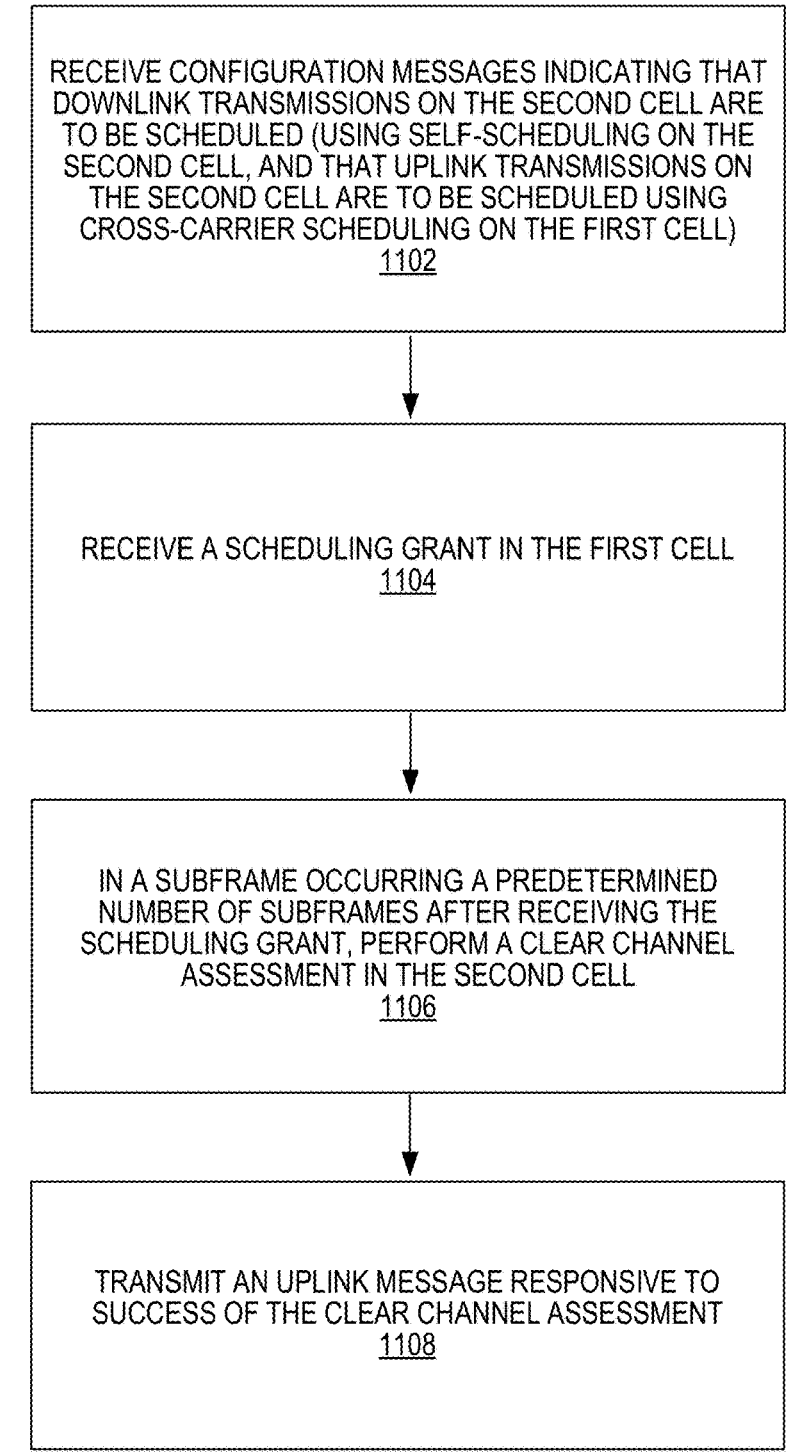
FIG. 11 is a flowchart illustrating a method in a wireless device for transmission using CCA, according to some embodiments.

An example embodiment in a wireless device will now be described with reference to the flowchart in FIG. 11 below. FIG. 11 illustrates a method 1100 performed at a wireless device. The wireless device is connected to a first cell and a second cell, wherein the second cell is configured on a carrier where an LBT protocol for transmission is required to be used. The method 1100 includes receiving a configuration message indicating that downlink transmissions on the second cell are to be scheduled (block 1102). Downlink transmissions may be scheduled using self-scheduling on the second cell, and that uplink transmissions on the second cell are to be scheduled using cross-carrier scheduling on the first cell. It is also possible that two separate configuration messages are received, one for the downlink and one for the uplink. The configuration message or messages may be transmitted via radio resource control (RRC) signalling. The method 1100 includes receiving a scheduling grant in the first cell (block 1104). The method 1100 includes, in a subframe occurring a predetermined number of subframes after receiving the scheduling grant, performing a clear channel assessment in the second cell (block 1106). The method 1100 includes transmitting an uplink message responsive to success of the clear channel assessment (block 1108).

In some variants, the wireless device is configured with carrier aggregation, and the first cell is the configured PCell, and the second cell is a configured SCell. The second cell may be configured on carrier that is shared with other radio technologies such as Wi-Fi. The carrier may use unlicensed spectrum.

An example embodiment in a network node, e.g., an LTE base station, will now be described with reference to the flowchart in FIG. 12. The method 1200 is performed at the network node that serves a first cell and a second cell, where the second cell is configured on a carrier where an LBT protocol for transmission is required to be used. The method 1200 includes transmitting, to a wireless device, one or more configuration messages indicating that downlink transmissions on the second cell are to be scheduled (block 1202). Downlink transmissions may be scheduled using self-scheduling on the second cell, and that uplink transmissions on the second cell are to be scheduled using cross-carrier scheduling on the first cell. It is equally possible to transmit two separate configuration messages, one for the downlink transmission and one for the uplink transmissions. Further, the method 1200 includes transmitting a scheduling grant to the wireless device in the first cell (block 1204). Advantageously, in the first cell, it is not required to use LBT. For instance, the first cell may be operating on LTE licensed spectrum. Thus, the network node may transmit the scheduling grant without first performing a CCA. Subsequent to transmitting the scheduling grant, the method 1200 includes receiving an uplink message from the wireless device in the second cell according to the transmitted scheduling grant (block 1206).

In a second embodiment, an assisting signal is transmitted in the DL to assist the operation of UL reverse direction grant protocol. This embodiment is to address the situation where the allowed channel occupancy time is not long enough to enable effective operation of the UL reverse direction grant protocol. In this example, the UE detects the reverse direction grant assistance signal before transmitting the UL without LBT.

Thus, the "reverse direction grant protocol" implies that the network node (e.g., a base station) performs CCA to secure channel access for the UE, so that the UE does not need to perform CCA before transmitting in the uplink. In some embodiments, the reverse direction grant assistance signal is a PDCCH or an EPDCCH. In other embodiments, the reverse direction grant assistance signal is a sequence of symbols transmitted in specific time-frequency locations known to the UE (such as the CRS). In some examples, the reverse direction grant assistance signal is a dedicated physical channel specifically defined for carrying said information. An example of such a dedicated physical channel is the physical hybrid-ARQ indicator channel (PHICH) in LTE.

In some embodiments, the reverse direction grant assistance signal conveys the number of subframes for which the channel access has been gained. Such information can be provided by signaling the number of subframes after the subframe in which the grant assistance signal occurs for which channel access is secured.

In an example, a UE is provided with location information of the reverse direction grant assistance signal within the frame structure. In an example implementation, this information is the number of subframes relative to the UL scheduling command. In the example illustration in FIG. 13, the UL transmission command in subframe n−4 contains a +3 index information, indicating the UE shall detect the reverse direction grant assistance signal in subframe n−1 before transmitting the UL without LBT.

In a second example, the location of the reverse direction grant assistance signal is known to UE. In a first example implementation, the location information is fixed in the standard specification. In a second example implementation, the location information is configured via higher layer signaling and becomes fixed for the serving cell until a reconfiguration.

In a third example, the reverse direction grant assistance signal, sent using any of the above methods, carries information for multiple UL SCells on which the UE can transmit without LBT.

In a fourth example, the reverse direction grant assistance signal is sent to the UE on a licensed PCell or SCell, along with associated CIF information to indicate the corresponding UL SCell. The "reverse direction grant assistance signal" is, throughout this disclosure, alternatively referred to as a "grant confirmation signal."

In another example, a network node serves a cell, wherein the cell is configured on a carrier where an LBT protocol for transmission is required to be used. At least one wireless device is connected to the cell. This method includes performing a CCA, and transmitting a scheduling grant to a wireless device when the CCA is successful. The network node then performs a second CCA and, when the second CCA is successful, it transmits a grant confirmation signal to the wireless device.

The second CCA may be performed a certain number of subframes (e.g., 3 subframes) after transmitting the scheduling grant. Thereby, channel access is secured for additional subframes, which is advantageous if the cell is configured on spectrum where the channel occupancy time is limited (for example, limited to 4 subframes). The grant confirmation signal may, in some variants, be transmitted shortly after the second CCA has succeeded, for example, in the following subframe.

The wireless device waits until it receives the grant confirmation signal before it actually performs a scheduled uplink transmission. Hence, the network node may receive an uplink transmission subsequent to transmitting the grant confirmation signal.

Advantageously, the network node may send scheduling grants to several wireless devices, and the second CCA may then be used to secure channel access for all these scheduled devices. Thereby, it is not necessary for each wireless device to perform a separate CCA before an uplink transmission. If each wireless device were to perform a separate CCA, the devices might interfere with each other, because the CCAs are likely to complete at slightly different times. Thus, if a first device has performed a successful CCA and started to transmit, the transmission from the first device might prevent a second device from obtaining channel access.

Figure 14:
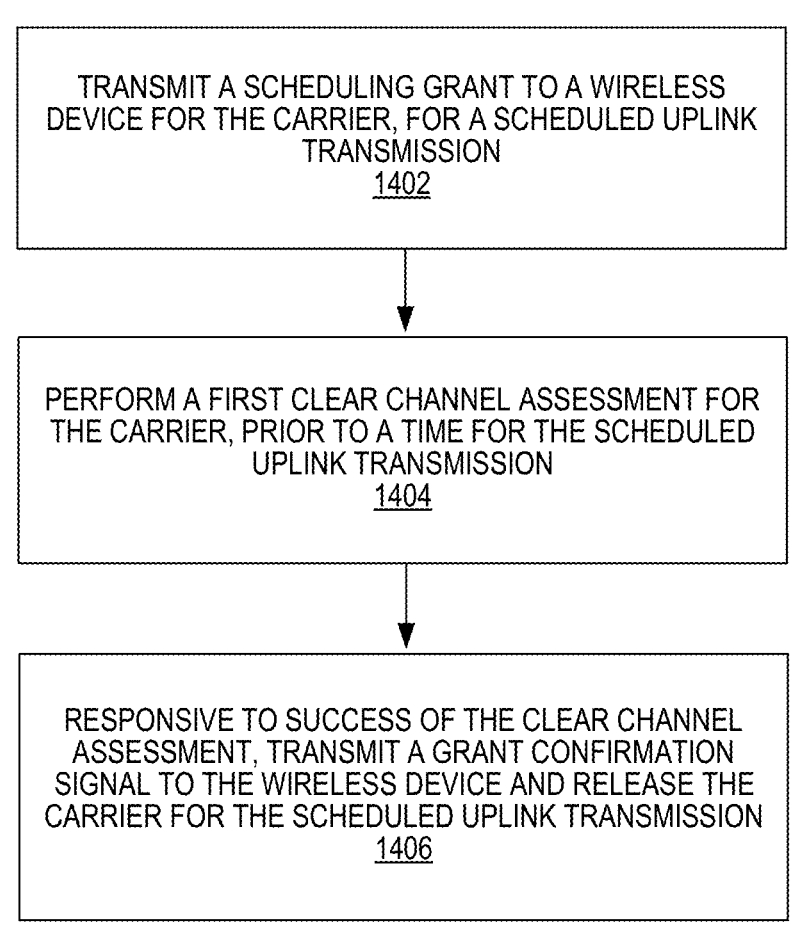
FIG. 14 is a flowchart illustrating a method in a network node for scheduling using CCA, according to some embodiments.

FIG. 14 illustrates another method 1400 performed by a network node. The method 1400 includes transmitting a scheduling grant to a wireless device for the carrier, for a scheduled uplink transmission (block 1402), and performing a first CCA for the carrier, prior to a time for the scheduled uplink transmission (block 1404). The transmitting of the scheduling grant may be preceded by performing a second CCA for the carrier. The first CCA may be performed a predetermined number of subframes after transmitting the scheduling grant. In some cases, the predetermined number of subframes is three.

The method 1400 also includes, responsive to success of the first CCA, transmitting a grant confirmation signal to the wireless device and releasing the carrier for the scheduled uplink transmission (block 1406). The grant confirmation signal may comprise an indication of the number of subframes for which channel access has been secured.

In some cases, scheduling grants may be transmitted to each of more than one wireless device responsive to the first CCA being successful. In some cases, the method 1400 includes scheduling all of the more than one wireless devices in each of every subframe for which channel access has been secured by performing the first CCA and releasing the carrier. In other cases, the method 1400 includes scheduling at least one wireless device for fewer than all of the subframes in a series of subframes for which channel access has been secured by performing the first CCA and releasing the carrier, where the grant confirmation signal transmitted to the at least one wireless device indicates the number of subframes for which channel access has been secured.

The method 1400 may include receiving an uplink transmission from the wireless device after transmitting the grant confirmation signal. The uplink transmission may be received in the subframe immediately following a subframe in which the grant confirmation signal was transmitted.

In another example, a wireless device is connected to a cell, wherein the cell is configured on a carrier where an LBT protocol for transmission is required to be used. The method comprises receiving a scheduling grant, and subsequently receiving a grant confirmation signal. Responsive to receiving the grant confirmation signal, the wireless device transmits an uplink message. The grant confirmation signal indicates to the wireless device that channel access has been secured. Thus, the wireless device does not need to perform CCA before transmitting the uplink message. As mentioned above, the network node has already performed the CCA before transmitting the grant confirmation signal and thereby secured channel access for the device (and possibly for other devices as well).

Figure 15:
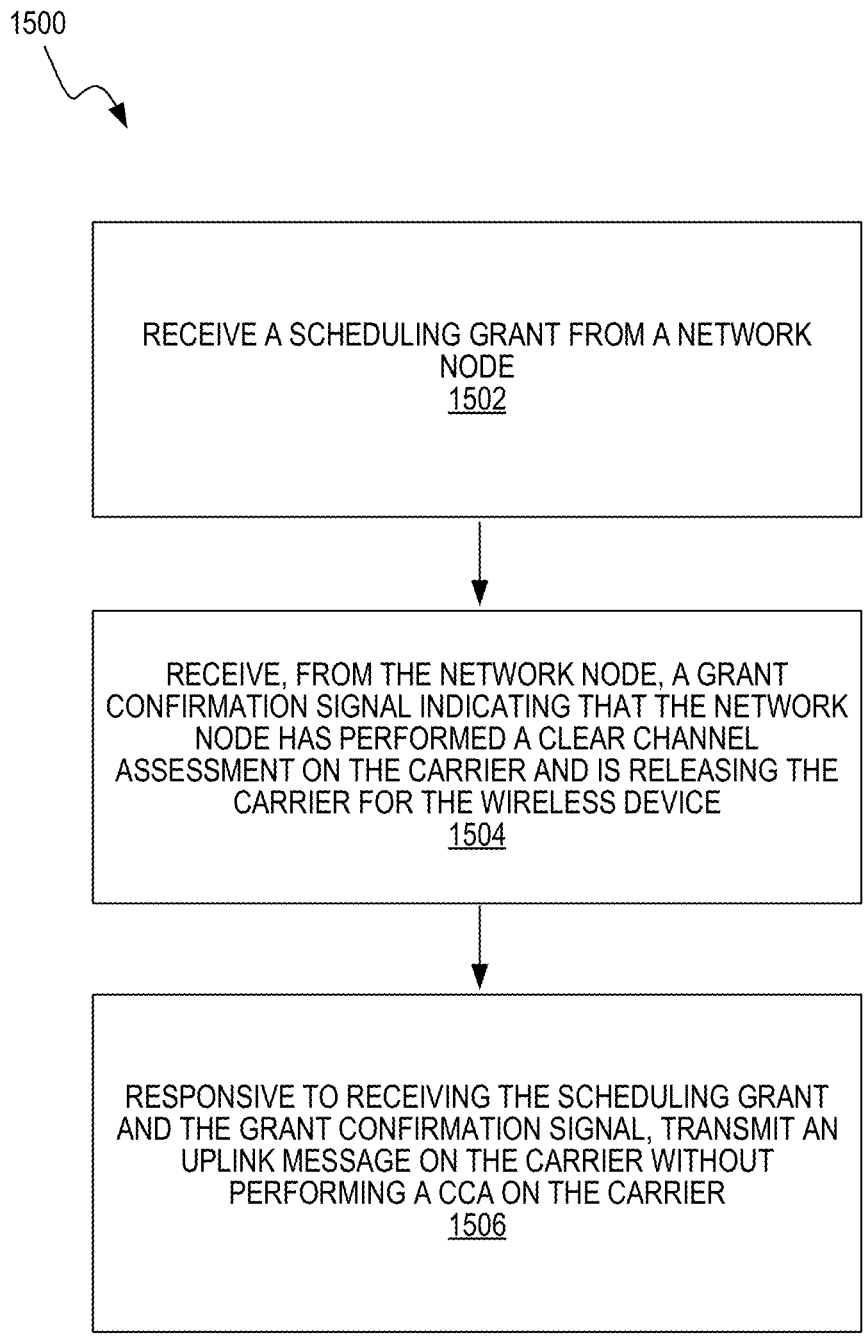
FIG. 15 is a flowchart illustrating a method in a wireless device for transmission, according to some embodiments.

FIG. 15 illustrates a method 1500 performed by a wireless device, according to some embodiments. The wireless device is connected to a cell, wherein the cell is configured on a carrier where an LBT protocol for transmission is required to be used. The method 1500 includes receiving a scheduling grant from a network node (e.g., base station) (block 1502). The method 1500 also includes receiving, from the network node, a grant confirmation signal indicating that the network node has performed a CCA on the carrier and is releasing the carrier for the wireless device (block 1504). The method 1500 further includes, responsive to receiving the scheduling grant and the grant confirmation signal, transmitting an uplink message on the carrier without performing a CCA on the carrier (block 1506). The grant confirmation signal may be received in, or subsequent to, the subframe before the first scheduled subframe according to the scheduling grant.

Figure 13:
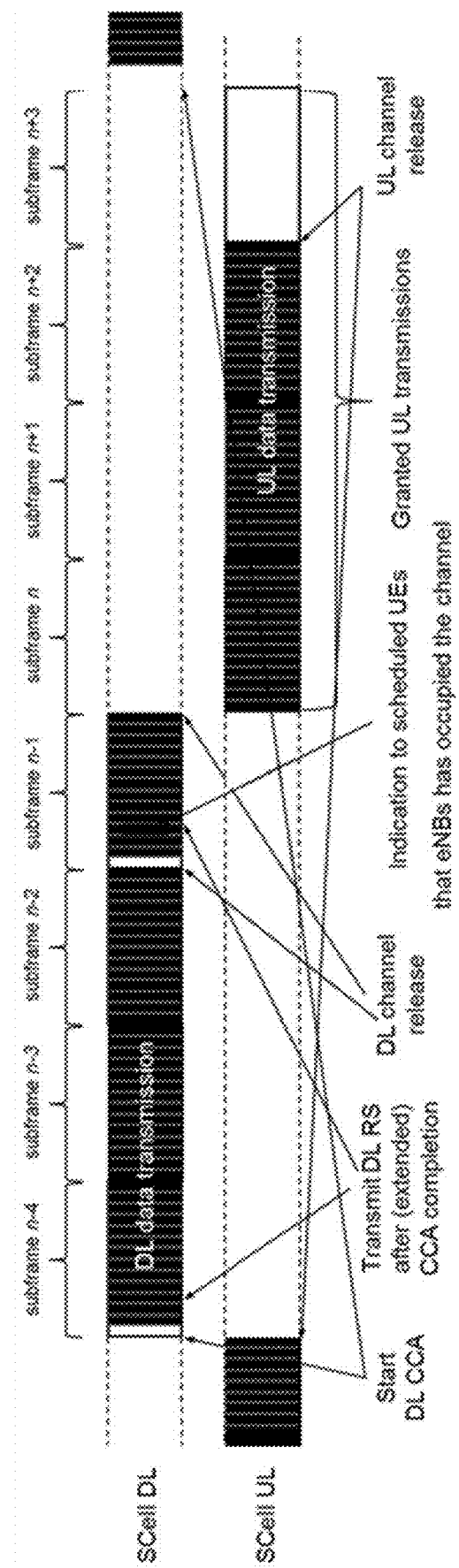
FIG. 13 is a diagram illustrating UL LAA transmissions based on a reverse direction grant protocol with an assisting DL indication.

In a third embodiment, when the UL transmission burst consists of multiple subframes after the channel is accessed and before the channel is released, all the UEs that are scheduled for UL transmissions in one burst are scheduled so that every UE is scheduled in each of the subframes. This method of scheduling can be combined with the reverse grant assistance signal in the previous embodiment where the signal is provided a certain number of subframes after the scheduling command is received by the UEs on the downlink as shown in FIG. 13. In this case, the grant assistance signal does not provide any information regarding the number of subframes for which channel access is secured. It only indicates the binary information regarding whether channel access has been secured or not. Each UE simply assumes that it can transmit in all subframes for which it has been scheduled.

In some embodiments, the UL transmissions for multiple UEs may be scheduled so that not all UEs transmit in all subframes in the transmission burst. In this case, for example, a particular UE may not be scheduled in the very first UL subframe of the transmitted burst. This method of scheduling UEs is then coupled with the embodiment where the reverse direction grant assistance signal indicates the number of subframes for which the channel access has been secured. Using this information, along with the scheduling information, allows the UE to determine whether it can transmit in a particular scheduled subframe without performing any LBT operation.

As for a fourth embodiment, cross-carrier scheduling based on EPDCCH is considered. For EPDCCH, it may be possible to avoid the case where EPDCCH is needed to be provided before or at the same time as the corresponding PDSCH. This is by configuring the EPDCCH to start later in the subframe than the PDSCH would start on the LAA SCell. However, the eNB would need to have completed the processing of the time domain signal to be transmitted soon within 1 OFDM symbol or similar timing relations before the EPDCCH is actually transmitted. However, it may be possible that the eNB creates two different time domains samples, i.e. one with the EPDCCH included and one excluding the EPDCCH. Then eNB can then choose the applicable OFDM symbol(s), the ones including EPDCCH or the ones excluding EPDCCH. Based on whether or not the PDSCH on the LAA SCell is transmitted. This problem occurs as soon as the eNB has to perform LBT for the LAA SCell.

Figure 16:
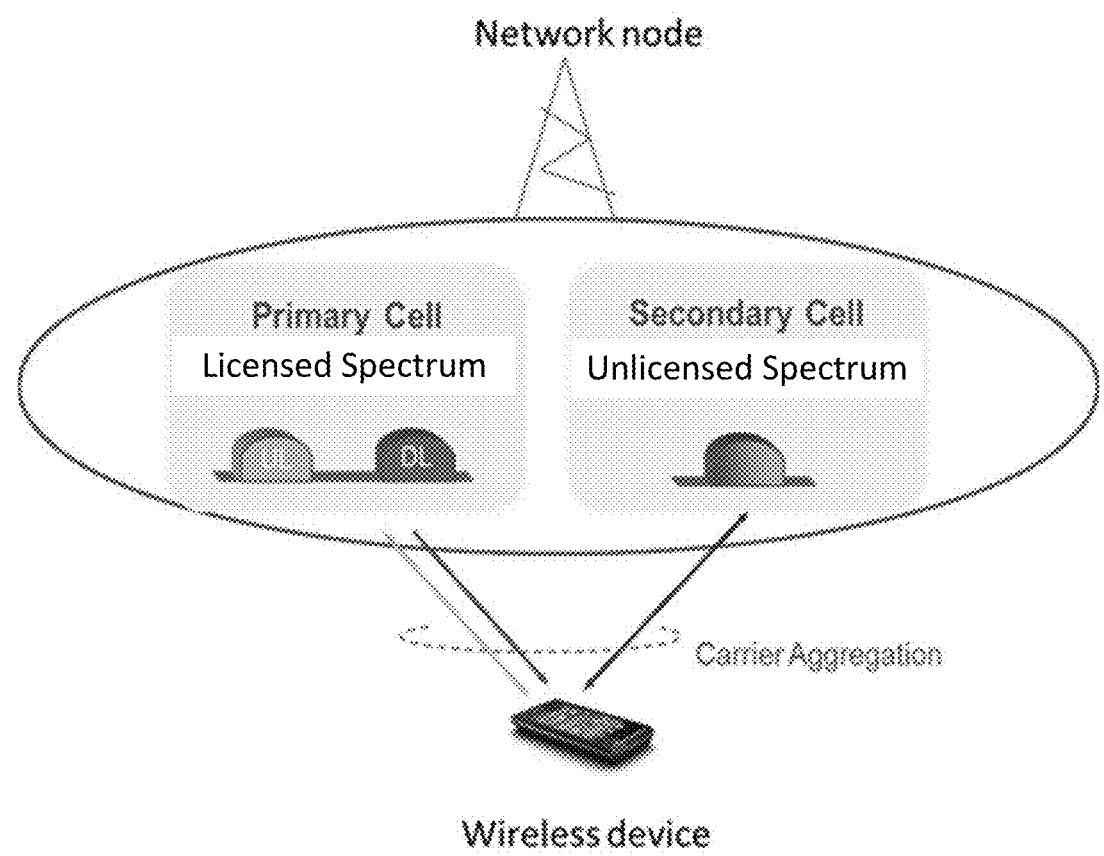
FIG. 16 illustrates an LTE network that uses CA in which some embodiments may be implemented.

Although the described solutions may be implemented in any appropriate type of telecommunication system supporting any suitable communication standards and using any suitable components, particular embodiments of the described solutions may be implemented in an LTE network using carrier aggregation, such as that illustrated in FIG. 16. Embodiments may also be implemented in a 5G network.

As shown in FIG. 16, the example network may include one or more instances of wireless communication devices (e.g., conventional user equipment (UEs), machine type communication (MTC)/machine-to-machine (M2M) UEs) and one or more radio access nodes (e.g., eNodeBs or other base stations) capable of communicating with these wireless communication devices along with any additional elements suitable to support communication between wireless communication devices or between a wireless communication device and another communication device (such as a landline telephone). Although the illustrated wireless communication devices may represent communication devices that include any suitable combination of hardware and/or software, these wireless communication devices may, in particular embodiments, represent devices such as the example wireless communication device illustrated in greater detail by FIG. 17. Similarly, although the illustrated radio access node may represent network nodes that include any suitable combination of hardware and/or software, these nodes may, in particular embodiments, represent devices such as the example radio access node illustrated in greater detail by FIG. 18. Note also that although FIG. 16 shows a network node serving two cells, it is possible that one or both cells are served by a remote radio unit (RRU) connected to the radio node. It may also be possible that the two cells shown in FIG. 16 are served by separate network nodes, which are in communication with each other.

Figure 17:
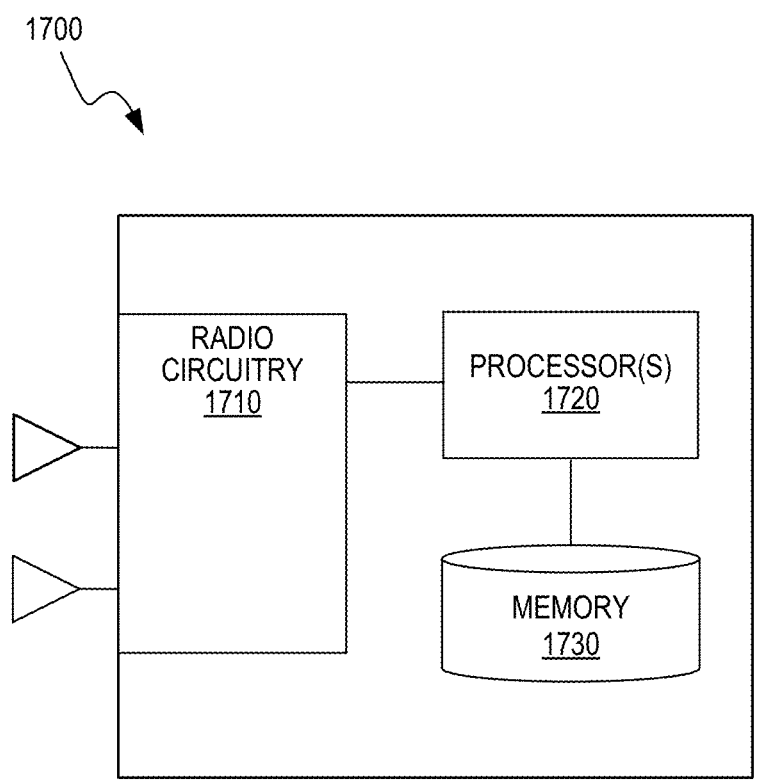
FIG. 17 illustrates a block diagram of a wireless device configured to perform related methods, according to some embodiments.

As shown in FIG. 17, the example wireless communication device 1700 includes processor(s) 1720, a memory 1730, radio circuitry 1710 and an antenna. In particular embodiments, some or all of the functionality described above as being provided by UEs, MTC or M2M devices, and/or any other types of wireless communication devices may be provided by the processor(s) 1720 executing instructions stored on a computer-readable medium, such as the memory 1730 shown in FIG. 17; the combination of the processor(s) 1720 and memory 1730 may be referred to collectively as "processing circuitry." Alternative embodiments of the wireless communication device 1700 may include additional components beyond those shown in FIG. 17 that may be responsible for providing certain aspects of the device's functionality, including any of the functionality described above and/or any functionality necessary to support the solution described above.

According to some embodiments, the wireless device 1700 is configured to be connectable to a first cell and a second cell, where the second cell is configured on a carrier where an LBT protocol for transmission is required to be used. The processing circuitry is configured to receive one or more configuration messages, via the radio circuitry 1710, indicating that downlink transmissions on the second cell are to be scheduled. Downlink transmissions may be scheduled using self-scheduling on the second cell, and that uplink transmissions on the second cell are to be scheduled using cross-carrier scheduling on the first cell. The processing circuitry is also configured to receive a scheduling grant in the first cell and, in a subframe occurring a predetermined number of subframes after receiving the scheduling grant, perform a CCA in the second cell. The processing circuitry is configured to use the radio circuitry 1710 to transmit an uplink message responsive to success of the CCA.

According to other embodiments, the wireless device 1700 is configured to be connected to a cell operated by a network node (e.g., base station) and configured to be connectable to a cell configured on a carrier where an LBT protocol for transmission is required to be used. The processing circuitry is configured to receive, via the radio circuitry 1710, a scheduling grant from the network node and receive, from the network node, a grant confirmation signal indicating that the network node has performed a CCA on the carrier and is releasing the carrier for the wireless device 1700. The processing circuitry is also configured to, responsive to receiving the scheduling grant and the grant confirmation signal, transmit an uplink message on the carrier without performing a CCA on the carrier.

Figure 18:
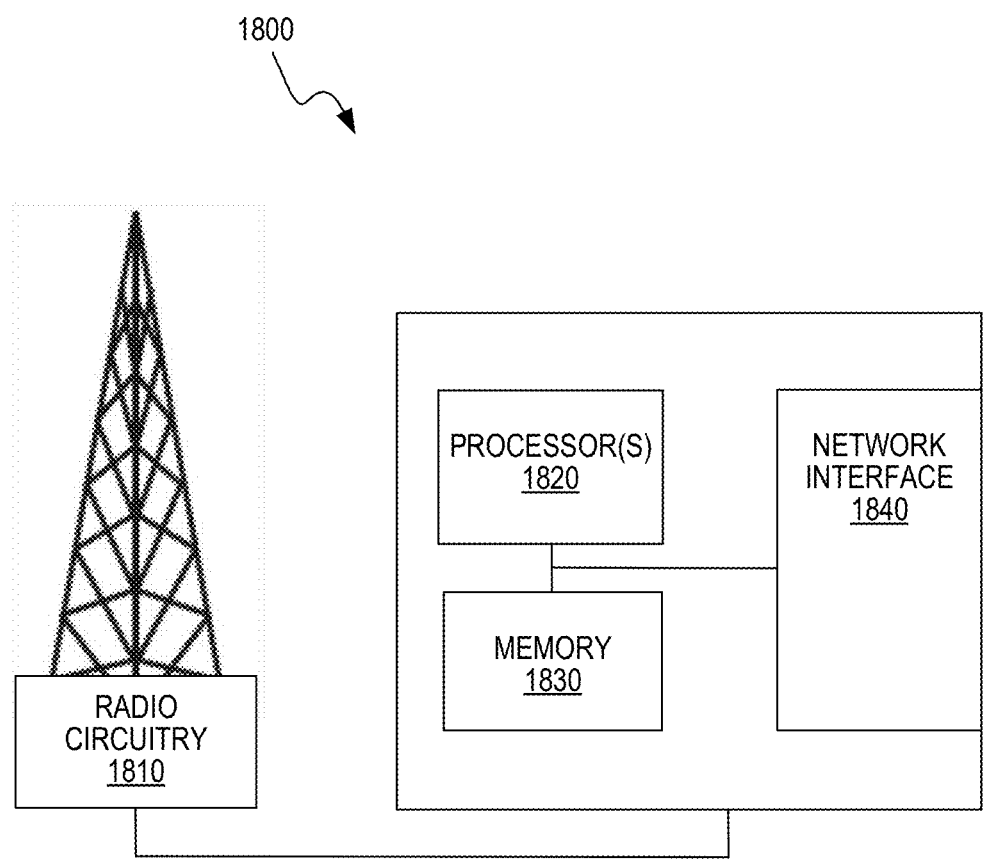
FIG. 18 illustrates a block diagram of a network node configured to perform related methods, according to some embodiments.

As shown in FIG. 18, an example radio access node, such as network node 1800, includes processor(s) 1820, a memory 1830, radio circuitry 1810, an antenna and a network interface 1840. In particular embodiments, some or all of the functionality described above as being provided by a base station, a node B, an eNodeB, and/or any other type of network node may be provided by the processor(s) 1820 executing instructions stored on a computer-readable medium, such as the memory 1830 shown in FIG. 18; the combination of processor(s) 1820 and memory 1830 may be collectively referred to as processing circuitry. Alternative embodiments of the radio access node may include additional components responsible for providing additional functionality, including any of the functionality identified above and/or any functionality necessary to support the solution described above.

According to some embodiments, the network node 1800 is configured to serve a first cell and a second cell, where the second cell is configured on a carrier where an LBT protocol for transmission is required to be used. The processing circuitry is configured to transmit, to a wireless device 1700 via the radio circuitry 1810, one or more configuration messages indicating that downlink transmissions on the second cell are to be scheduled. Downlink transmissions may be scheduled using self-scheduling on the second cell, and that uplink transmissions on the second cell are to be scheduled using cross-carrier scheduling on the first cell. The processing circuitry is also configured to transmit a scheduling grant to the wireless device 1700 in the first cell and receive an uplink message from the wireless device 1700 in the second cell, according to the transmitted scheduling grant.

According to other embodiments, the processing circuitry of the network node 1800 is configured to transmit a scheduling grant to a wireless device for the carrier, via the radio circuitry 1810, for a scheduled uplink transmission and perform a first CCA for the carrier, prior to a time for the scheduled uplink transmission. The processing circuitry is also configured to, responsive to success of the first CCA, transmit a grant confirmation signal to the wireless device and release the carrier for the scheduled uplink transmission.

Figure 32:
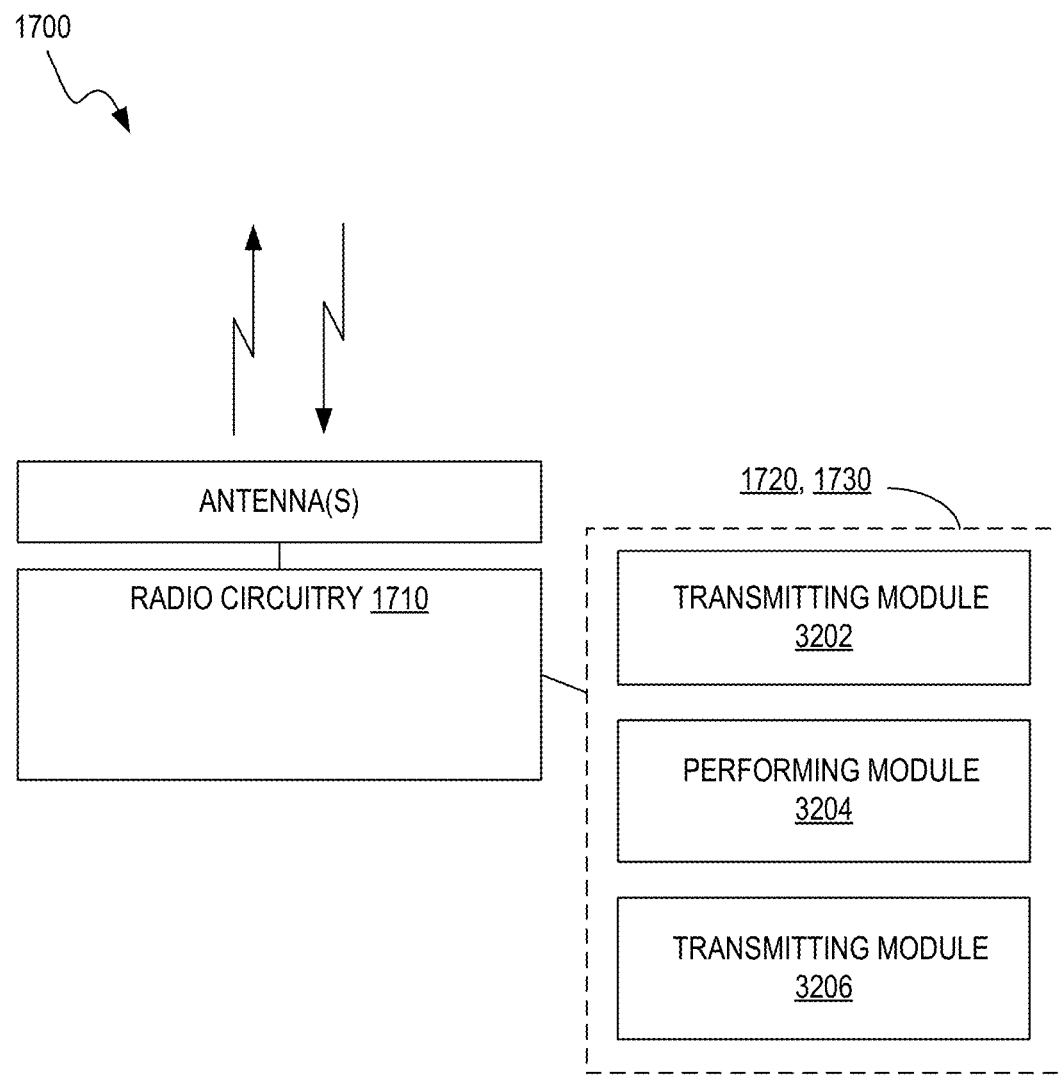
FIG. 32 illustrates an example functional implementation of a wireless device, according to some embodiments.

FIG. 32 illustrates an example functional module or circuit architecture as may be implemented in the wireless device 1700. The illustrated embodiment at least functionally includes a receiving module 3202 for receiving one or more configuration messages indicating that downlink transmissions on the second cell are to be scheduled. The receiving module (3202) is also for receiving a scheduling grant in the first cell. The implementation also includes a performing module 3204 for, in a subframe occurring a predetermined number of subframes after receiving the scheduling grant, performing a CCA in the second cell. The implementation also includes a transmitting module 3206 for transmitting an uplink message responsive to success of the CCA.

Figure 33:
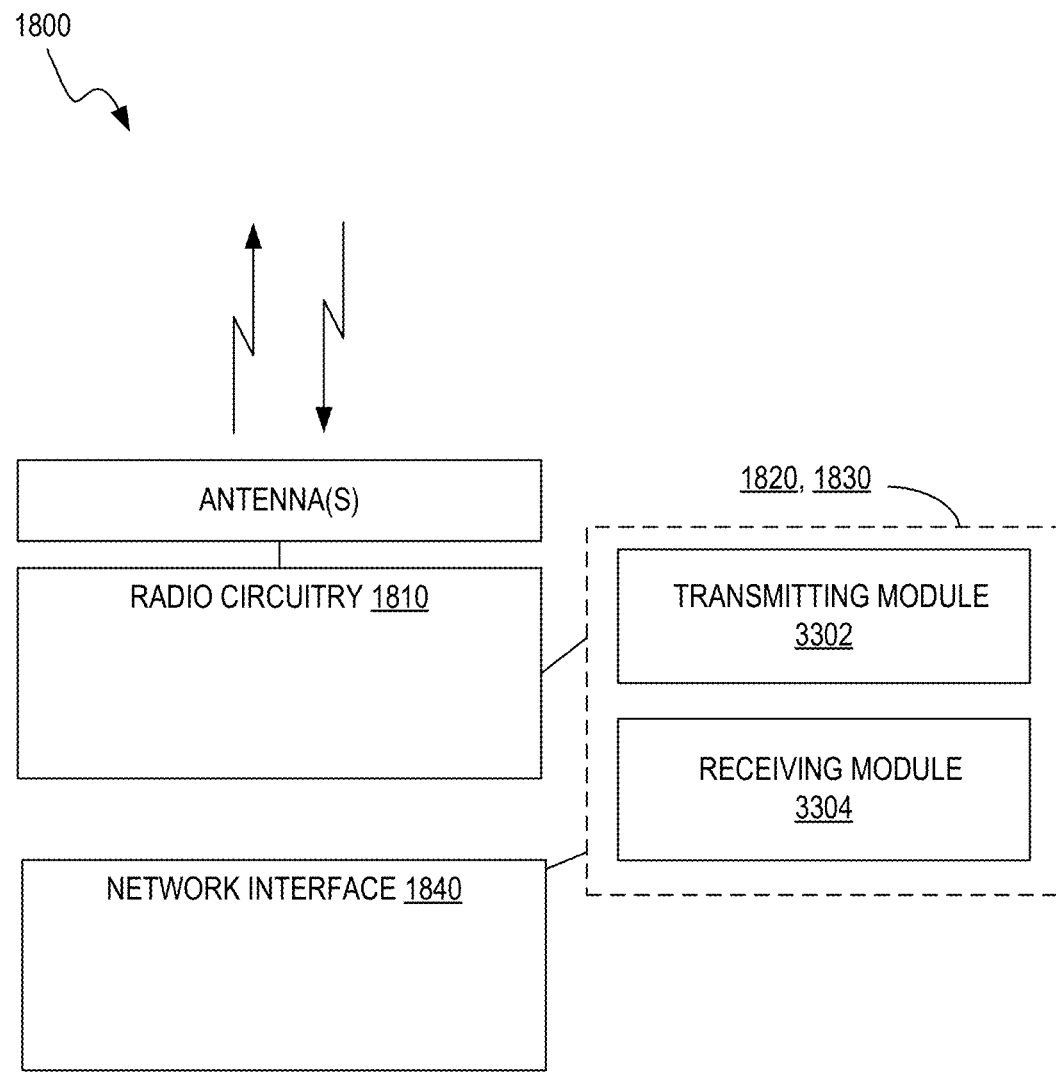
FIG. 33 illustrates an example functional implementation of a network node, according to some embodiments.

FIG. 33 illustrates an example functional module or circuit architecture as may be implemented in the network node 1800. The illustrated embodiment at least functionally includes a transmitting module 3302 for transmitting, to a wireless device, one or more configuration messages indicating that downlink transmissions on the second cell are to be scheduled. The transmitting module 3302 is also for transmitting a scheduling grant to the wireless device in the first cell. The illustrated embodiment further includes a receiving module 3304 for receiving an uplink message from the wireless device in the second cell, according to the transmitted scheduling grant.

Figure 34:
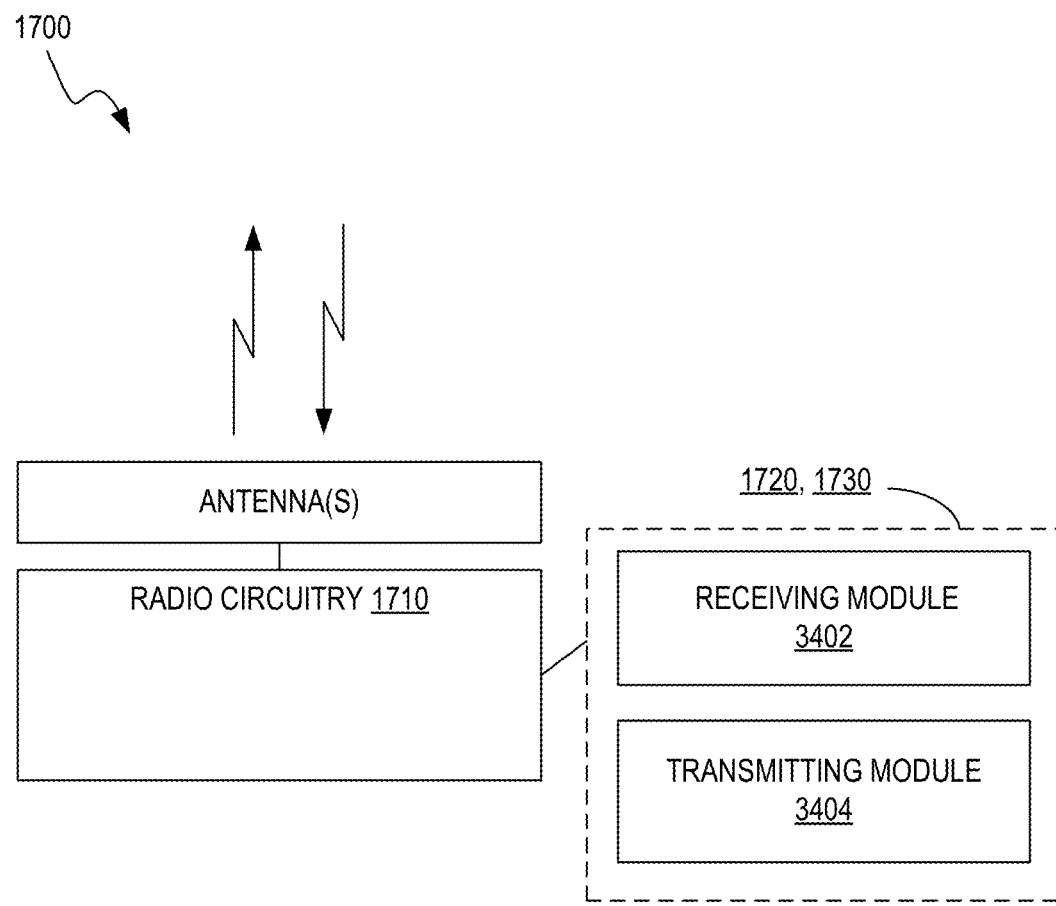
FIG. 34 illustrates another example functional implementation of a wireless device, according to some embodiments.
Figure 35:
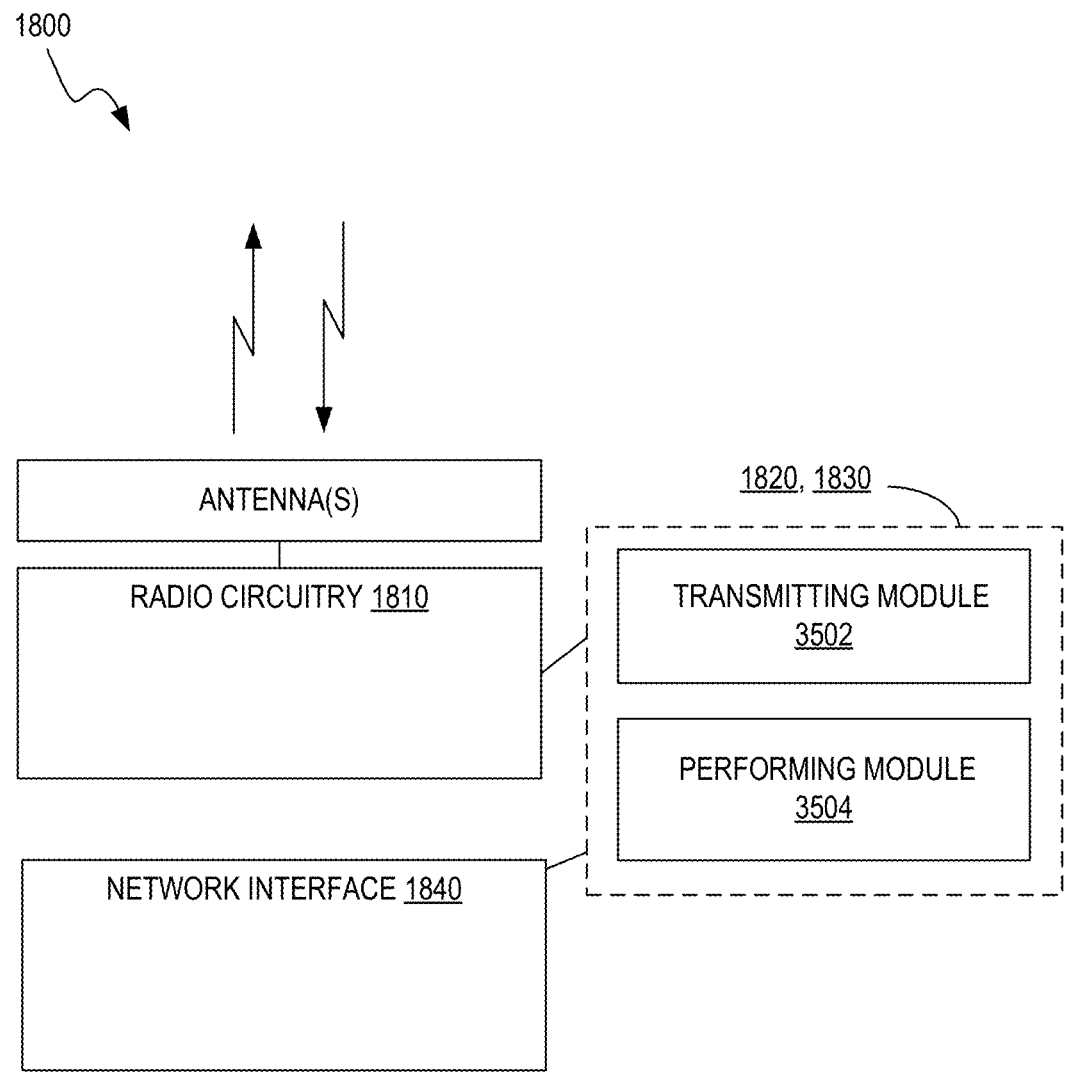
FIG. 35 illustrates another example functional implementation of a network node, according to some embodiments.

FIG. 34 illustrates another example functional module or circuit architecture as may be implemented in the wireless device 1700. The illustrated embodiment at least functionally a receiving module 3402 for receiving a scheduling grant from a network node and for receiving, from the network node, a grant confirmation signal indicating that the network node has performed a CCA on the carrier and is releasing the carrier for the wireless device. The implementation also includes a transmitting module 3404 for, responsive to receiving the scheduling grant and the grant confirmation signal, transmitting an uplink message on the carrier without performing a CCA on the carrier.

FIG. 33 illustrates another example functional module or circuit architecture as may be implemented in the network node 1800. The illustrated embodiment at least functionally includes a transmitting module 3502 for transmitting a scheduling grant to a wireless device for the carrier, for a scheduled uplink transmission. The implementation also includes a performing module 3504 for performing a first CCA for the carrier, prior to a time for the scheduled uplink transmission. The transmitting module 3502 is also for, responsive to success of the first CCA, transmitting a grant confirmation signal to the wireless device and releasing the carrier for the scheduled uplink transmission.

Example Solutions

According to some embodiments, certain aspects could be implemented within the framework of a specific communication standard. Specifically, changes could be made to one or more of the 3GPP specifications 3GPP TS 36.211 V11.4.0, 36.213 V11.4.0 and 36.331 V11.5.0, which methods can be used to implement certain embodiments of the described solutions. The following examples are merely intended to illustrate how a particular embodiment could be implemented in a particular standard. However, the example solutions could also be implemented in other suitable manners, both in the above mentioned specifications and in other specifications or standards.

The LTE design supports, in general, two different scheduling approaches: cross-carrier scheduling and self-scheduling. The supported set of scheduling design needs some considerations for LAA SCell due to the LBT requirements on an LAA SCell, which differs from the previous LTE designs. For example, in one embodiment, self-scheduling is used for DL and cross-carrier scheduling is used on UL. In another embodiment, cross-carrier scheduling is used on DL and self-scheduling is used on UL. An applicable design of self-scheduling will be described before an applicable design for cross-carrier scheduling.

For the case of a DL-only LAA SCell that operates self-scheduling, the assumption is that the DCI message is provided by EPDCCH. If the UE finds an applicable EPDCCH, it would know that it has been assigned a PDSCH within that subframe. On the eNB side, this type of operation is rather straightforward, as either the eNB succeeds with its LBT operations or it does not. If the eNB succeeds with the LBT operation, the eNB transmits both EPDCCH and PDSCH. For subframes that do not require a new LBT procedure, the eNB simply transmits EPDCCH and PDSCH. The requirement to support this operation is that the eNB configures an EPDCCH that always starts, for example, three OFDM symbols into the subframe. Moreover, it should be allowed for the PDSCH to start from the first OFDM symbol or with the same offset as the EPDCCH.

Figure 19:
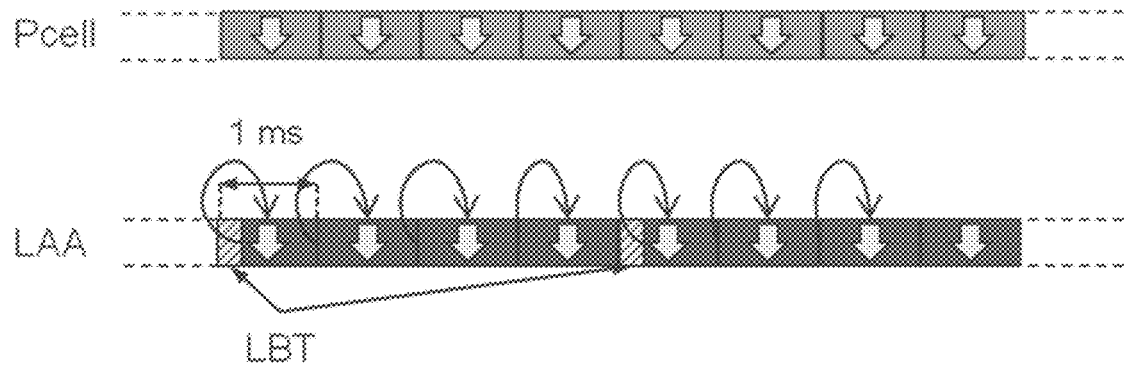
FIG. 19 is a diagram illustrating an embodiment of DL-only LAA SCell self-scheduling.

As shown in FIG. 19, one embodiment is that for DL-only, LAA SCell self-scheduling is based on EPDCCH. For the case when LAA SCell operates both UL+DL, the DL scheduling with above EPDCCH approach can be reused. For UL scheduling, however, some further consideration is needed. The reason is that if the UL is scheduled from an LAA SCell that requires DL LBT at eNB, and if it is also so that the UL transmission on the UE side requires UL LBT, the actual PUSCH transmission in this case requires two LBT procedures. Another option is that only the eNB performs LBT, which is due to the UE transmitting directly after the eNB or another UE. The eNB can perform LBT and hold the channel for UEs within a maximum channel occupancy time. The UE accesses the channel in the UL for the remaining subframes to transmit PUSCH. In Wi-Fi, Reverse Direction Grant (RDG) is used so that one STA could grant the channel to another STA within the transmit opportunity (TxOp).

A similar approach can be applied in LAA. The scheduling delay of 4 ms in LAA may be used, or some other optimization for self-scheduling design for UL based on the impact on the LAA UL performance and/or assuming the similar applicable features for Wi-Fi.

Figure 20:
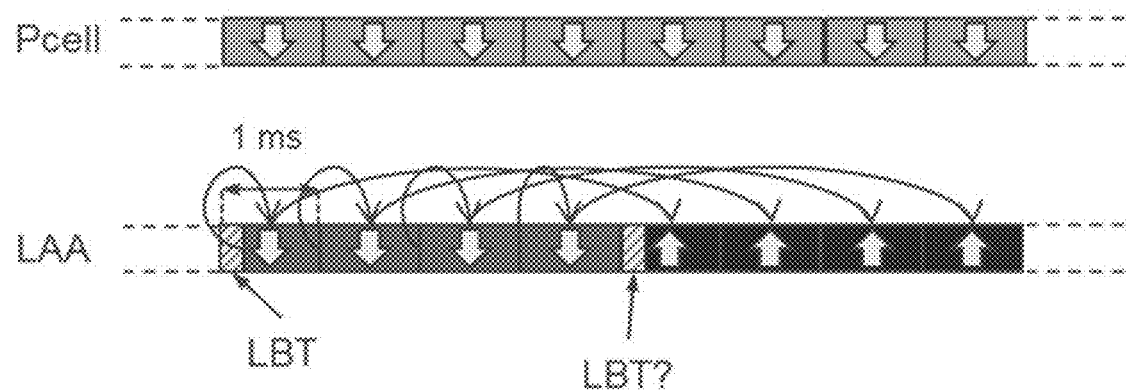
FIG. 20 is a diagram illustrating an embodiment of UL+DL LAA SCell self-scheduling.

In another embodiment illustrated by FIG. 20, for UL+DL LAA, DL scheduling is based on self-scheduling with EPDCCH. Also for UL+DL LAA, UL scheduling is based on self-scheduling with EPDCCH. Adjustment to the LBT procedure in UL may need to be done in case self-scheduling is operated.

Figure 21:
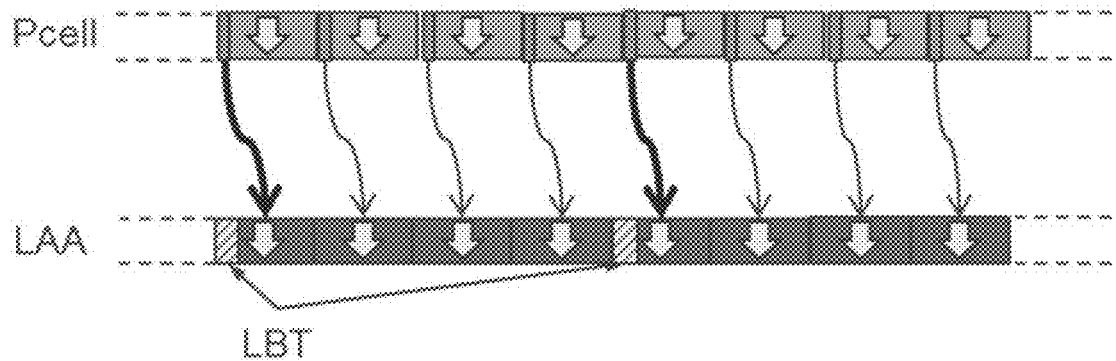
FIG. 21 is a diagram illustrating an embodiment of DL-only LAA cross-carrier scheduling based on PDCCH.

Regarding cross-carrier scheduling, it may be assumed that the LAA SCell is scheduled from a licensed carrier. An LAA SCell may also be scheduled from another LAA SCell. In the case of DL-only LAA SCell, there are basically two different operational modes. The first is assuming that the PDCCH is used to schedule the LAA SCell and the second is that EPDCCH is used to schedule the LAA SCell. Assuming that the PDCCH is used, there will be a potential issue in the first subframe of a TxOP. The reason is that the eNB would need to transmit the PDCCH either before or at the same time as the PDSCH starts to be transmitted towards the UE. Since LBT needs to be done on LAA SCell in the beginning of the first subframe of TxOP, it is uncertain whether PDSCH will be transmitted on LAA SCell when PDCCH is transmitted on PCell as shown in FIG. 21. The PDCCH can therefore not indicate whether or not the PDSCH is actually transmitted to the UE. The UE would therefore need to blindly detect the presence of the PDSCH on the LAA SCell based on detecting some form of signal on the LAA SCell.

An example solution is that the UE detects the presence of the initial signal, but this may require that the initial signal is transmitted long enough to allow a reliable detection at the UE side. Another alternative solution is that some signal is embedded in the beginning of the first PDSCH. The two last approaches have an issue with the scenario where the UE's ON duration of the discontinuous reception (DRX) procedure is not aligned with TxOP duration, and hence these two approaches are not preferred from this perspective. Blind detection of the PDSCH may be performed assuming a very low error rate to avoid corrupting the soft buffer. A DL may be cross-carrier scheduled from PDCCH on a carrier operating on a carrier operated in licensed spectrum.

Cross-carrier scheduling may be based on EPDCCH. For EPDCCH, it may be possible to avoid the case that EPDCCH needs to be provided before or at the same time as the corresponding PDSCH. This is done by configuring the EPDCCH to start later in the subframe than the PDSCH would start on the LAA SCell.

Figure 22:
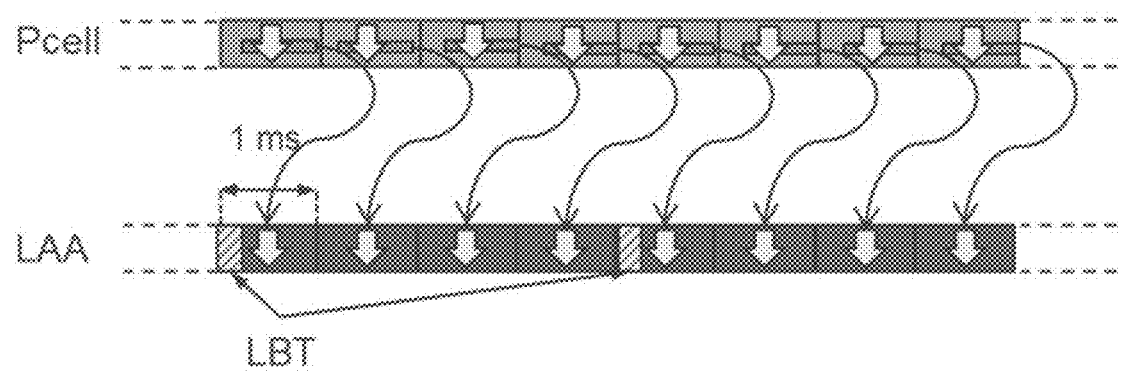
FIG. 22 is a diagram illustrating an embodiment of DL-only LAA cross-carrier scheduling based on EPDCCH.
Figure 23:
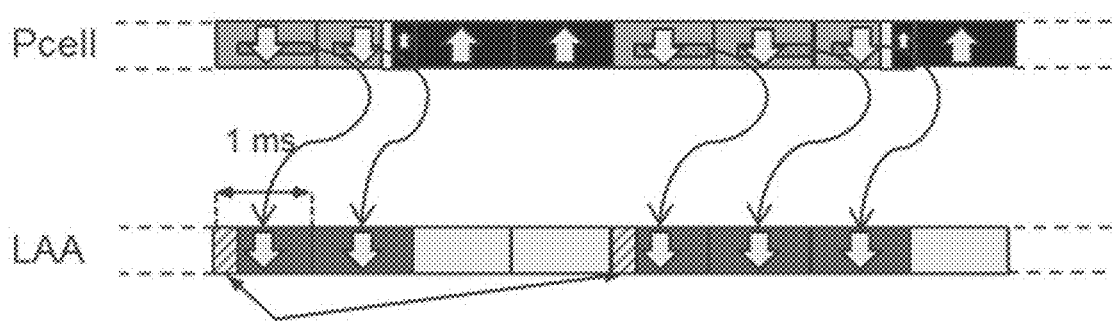
FIG. 23 is a diagram illustrating an embodiment of DL-only LAA cross-carrier scheduling based on EPDCCH.

Another embodiment is illustrated by FIG. 22. There are some common issues for both EPDCCH and PDCCH based on DL cross-carrier scheduling. The first issue is that when the scheduling carrier is operating TDD, it is not possible for all subframes on the LAA SCell to be scheduled. This is because that DL assignment is only applicable for the same subframe in which the (E)PDCCH is transmitted. This will be an issue if only DL cross-scheduling is supported as there will be no defined way to schedule the unused subframes as shown in FIG. 23. Potentially, multi-subframe scheduling may resolve this. However, if it is so that the amount of licensed carriers is very limited and there is a large amount of unlicensed carriers, there is a risk that the licensed carrier will need to take a very large overhead for scheduling LAA SCells. This may impact the usability of LAA SCell, if for example, the scheduling carrier on licensed spectrum is in a macro eNB which serves many UEs and operates many LAA SCells. This latter problem may be solved by allowing cross-carrier scheduling from an LAA SCell to another LAA SCell, although there is no clear benefit with this compared to operating each LAA SCell in DL-only with self-scheduling. DL cross-carrier scheduling may impact severally the amount of schedulable subframes in case the scheduling cell is operating TDD. If there are many unlicensed LAA SCell there together with using DL cross-carrier, there may be a problem with overhead on the licensed carriers.

Cross-carrier scheduling from a carrier in licensed spectrum is considered for both DL and UL scheduling. Compared to DL based cross-carrier scheduling, this is more straightforward, assuming that the amount of carriers in licensed spectrum are rather balanced compared to the amount of carriers used in the unlicensed band. In addition, the scheduling cell is FDD. It would, in this instance, be possible to avoid the case that both the eNB and UE would be required to do LBT, by simply relying on that the UE performs LBT before transmitting.

Figure 24:
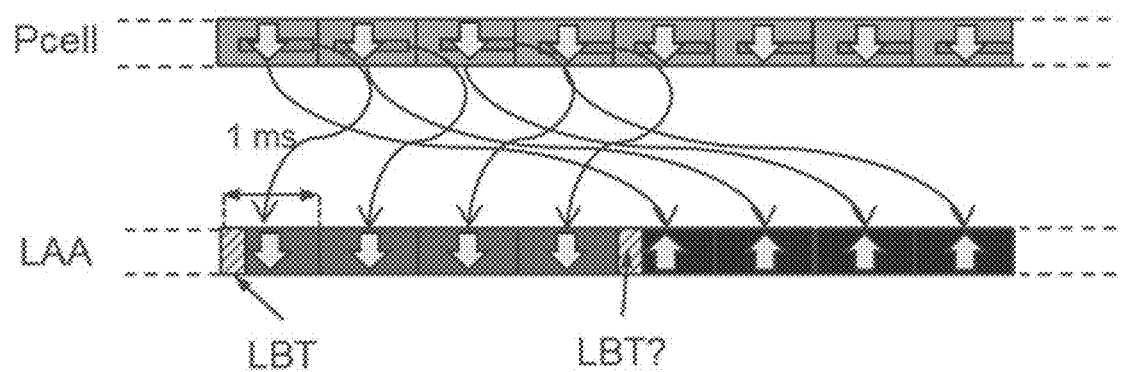
FIG. 24 is a diagram illustrating an embodiment of UL+DL based cross-carrier scheduling based on EPDCCH.
Figure 25:
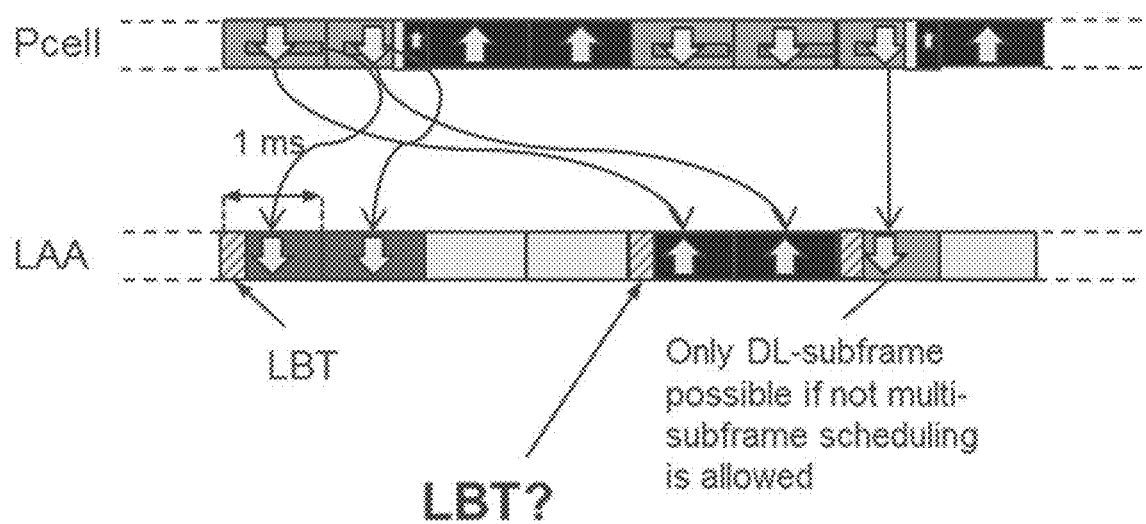
FIG. 25 is a diagram illustrating an embodiment of UL+DL based cross-carrier scheduling based on EPDCCH with a TDD scheduling cell.

FIG. 24 illustrates another embodiment, where UL+DL based cross-carrier scheduling is based on EPDCCH. Assuming that the scheduling cell is FDD and that the amount of unlicensed spectrum used is rather balanced compared to the amount of licensed spectrum, support cross-carrier scheduling for UL from either (E)PDCCH may be beneficial. There are some further aspects that need to be considered. If the scheduling cell were operating in TDD mode, there would be a need to support multi-subframe scheduling for the UL in order to get an efficient operation. FIG. 25 illustrates another embodiment, where UL+DL based cross-carrier scheduling is based on EPDCCH with a TDD scheduling cell. The above limitations with self-scheduling and cross-carrier scheduling may or may not be solved by allowing cross-carrier scheduling between different LAA SCell. In some cases, self-scheduling is supported on the same carrier as the UL message will be transmitted. Consequently, there is a need to define an LBT procedure allows self-scheduling for both UL and DL for LAA to operate in a fair manner with Wi-Fi. If in addition cross-carrier scheduling is wished to be supported, a cross-carrier scheduling solution may be for UL only while the DL is fully based on self-scheduling. In some cases, self-scheduling is based on EPDCCH for both UL and DL for any number of aggregated unlicensed carriers. In other cases, cross-carrier scheduling for UL from (E)PDCCH is supported together with self-scheduling for DL. The cross-carrier scheduling may also be for if the scheduling cell is TDD.

In sum, various embodiments may include the following: 1) for DL-only, LAA SCell self-scheduling is based on EPDCCH; 2) for UL+DL LAA, DL scheduling is based on self-scheduling with EPDCCH; 3) for UL+DL LAA, UL scheduling is based on self-scheduling with EPDCCH; 4) self-scheduling is based on EPDCCH for both UL and DL for any number of aggregated unlicensed carriers; and 5) cross-carrier scheduling for UL from (E)PDCCH is supported together with self-scheduling for DL.

Additional LAA Embodiments

In some embodiments, the following functionalities may be included, in addition to the current LAA TR on the unlicensed band: radio resource management (RRM) measurement including cell identification; automatic gain control (AGC) setting; coarse synchronization; fine frequency/time estimation for at least demodulation; and channel state information (CSI) measurement, including channel and interference. Rel-12 DRS can be the starting point for at least RRM measurement including cell identification.

PHY-layer solutions will be described for how to perform measurement and reporting of CSI for an LAA SCell, according to some embodiments. From an LTE carrier aggregation perspective, all serving cells are categorized as intra-frequency cells. In LAA, the unlicensed carrier can dynamically be changed according to the channel selection process in the eNB. Also, the CRS on which the reference signal received power (RSRP) and reference signal received quality (RSRQ) are based on are sparse and further subjected to LBT. This will have an impact on the UE measurement performance.

In Rel-12, RSRP and RSRQ measurements are supported for the discovery signal, while there is no support of reference signal time difference (RSTD) and Rx-Tx time difference. The same measurements may be supported for measurements in Rel-13 as for Rel-12. Support of RSTD and Rx-Tx time difference can be added later if location based services are needed for LAA.

In one embodiment, for LAA, support for RSTD and Rx-Tx time diff is not required. When a SCell is active, from a measurements point of view, it is subject to performance requirements as an intra-frequency cell with discovery signal. If a discovery signal is subject to LBT, the detection of a new LAA cell can potentially take longer. The detection period of a 20 MHz channel is 15 DMTC periods. It may be noted that the identification of an LAA intra frequency cell can be potentially longer due to LBT of the discovery signal.

The measurement performance between legacy LTE cells vs legacy LTE cells with discovery signal vs LAA cells with LBT will vary. It is likely that since the legacy LTE cells will be detected earlier and appears to be more stable, they may be better candidates for SCell addition. Since the decision of selecting an LAA cell is service based, algorithms for comparing licensed vs unlicensed carrier operation may be considered.

RSRP and RSRQ measurements in the UE require positive identification and will fail when LBT fails. Received signal strength indicator (RSSI) measurements on the other hand can always be measured by the UE. RSSI measurements during an LBT failure on occasion can also be useful to the eNB. When tracked by the UE over a longer period of time, the eNB can get an idea of the other users on the carrier by using only the measurements during LBT failures. Such information can be used for the longer term channel selection. In order to distinguish between RSSI from LBT failure occasions and RSSI from LBT success occasions, two approaches are possible. The first approach would be that the UE detects LBT success/failure and tags the RSSI report with the corresponding detection result. In the second approach, the UE simply reports RSSI together with a potential time-stamp so that the eNB can keep track of and filter the reports based on its LBT history.

In an embodiment, RSSI measurements are reported to the eNB regardless of whether LBT detection showed success or failure. The UE could either tag each report with the result from LBT detection or tag each report with a time stamp. With the latter option the eNB can keep track of the reports and filter them based on its LBT history. The discovery signal may have gaps that give the opportunity for Wi-Fi to use the channel.

The following is a discussion on the types of information that can be conveyed in order to improve the system performance. Network ID: Since multiple operators are sharing the same channel, the physical cell identity is not sufficient identify the correct cell. The network identity may be transmitted on the discovery channel. The UE may ensure that this is decoded prior to performing any quality measurements.

In another embodiment, the Network-ID is included in the discovery signal to enable the UE to correctly identify its own cell. As for operating Carriers, an eNB may operate on several LAA carriers simultaneously. If the eNB can send the LAA carriers on which it is operating, other operator eNBs can use this information as input to its channel selection. That is, if possible avoiding these particular LAA carriers. As for carrier Usage, similarly, channel usage metrics for the operating carriers may also be sent over the discovery signal to further aid another operator's eNBs for channel selection. This information would be even more useful when most LAA carriers are used and busy and more detailed information of each channel is required. The point of broadcasting control information over the discovery signal is that this cannot be done (for the above mentioned parameters) via the PCell. First, the dynamic changes in the parameters would cause an increase in the X2 signalling load. Second, the PCell would have to be co-located.

In another embodiment, the operating carrier and carrier usage metrics are used in the discovery signal. Another parameter to consider broadcasting over the discovery signal is the neighbor cell list. This may be a situation where the macro cell is containing many small LAA cells.

In sum, RRM measurements for an LAA SCell were discussed and based on the discussion in the contribution, the following may be considered: since positioning features are not envisioned in this time frame, support for RSTD and Rx-Tx time diff is not required; RSSI measurements are reported to the eNB; take action when a cell detection fails at the UE; include the Network-ID in the discovery signal to enable the UE to correctly identify its own cell; and consider including the operating carrier and carrier usage metrics in the discovery signal.

Further LAA Embodiments

Handling CSI measurements on LAA SCells needs to be handled with some care. The CSI measurements may consist of two different measurement resources: CSI-RS and CSI-IM. The reason is that CSI measurement opportunities at the UE will be much more difficult to obtain when operating an LAA SCell because the eNB needs to perform LBT before transmitting CSI-RS. One embodiments includes extending the CSI-RS design so that the UE is configured to expect CSI-RS in a subframe or a set of subframes with a configured periodicity and offset. The eNB then performs LBT on CSI-RS and the UE would need to blindly detect the presence of the CSI-RS. It is notable that it is very difficult to get a good blind detection of a single CSI-RS resource. The risk of falsely detecting the presence of CSI-RS is large, i.e., the situation where the UE believes that the eNB has transmitted the CSI-RS but the eNB has not. It is noted that the presence of a specific CSI-RS needs to be indicated to the UE.

Before further discussion on the different approaches on CSI-RS transmissions, the value of periodic and aperiodic CSI reports for LAA SCells will be described. It is assumed that the interference conditions may be very varying on an LAA SCell over time. At the same time, the scenario that is considered is a very low mobility scenario. The underlying spatial properties and channel quality (if the interference conditions are excluded) is hence rather static over time. At the same time, it is assumed that the LAA SCell will mainly be used to expand the data rate, i.e., if the eNB has large amount of DL data to schedule to UE the eNB will utilise LAA SCells. Correspondingly, the LAA SCell will be used for significant time before the eNB has emptied its transmission buffer. Due to this, it is unlikely that the eNB will activate LAA SCells without scheduling data on them for a long period of time. Periodic CSI reports are mainly used to get a good starting point for the link adaptation and scheduling and when data is being continuously scheduled the resolution of the periodic CSI report is not good enough. This due to that the level of resolution in the periodic CSI feedback is not good enough to provide reliable scheduling of high date rate. In addition, the reliable transmission of reference signals for CSI in a periodic manner on the unlicensed band will not be possible due to a potential lack of access to the channel. Due to all of the above reasons the most practical approach would be to rely only on aperiodic CSI reports for LAA SCell.

According, in some embodiments, LAA SCells do not support periodic CSI reports, but do support aperiodic CSI reports. Going back to the need for the CSI-RS presence to be indicated to the UE, this needs to be done with minimal delay as the eNB will decide in a very short time frame whether or not to transmit a specific set of subframe(s). It is possible to introduce a specific indicator that indicates the presence of the CSI-RS, as for example, a specific DCI message that is scrambled with specific radio network temporary identifier (RNTI) and indicates the presence of a CSI reference signal (CSI-RS) on a specific carrier or group of carriers. This would require that the message is sent on a search space that is common for many UEs, e.g. on Pcell. This together with the DCI message could indicate which SCell the message applies to and potentially when in time.

In other embodiments, the presence of the CSI-RS is indicated to the UE receiving the UL Grant which indicates that an aperiodic CSI message should be sent for the specific cell. In a case when the UL Grant is sent on the SCell that the aperiodic CSI report is triggered for, it is easy for the eNB to ensure that CSI-RS is transmitted together with the UL grant. If, however, the UL grant indicates an aperiodic CSI-RS report for a different cell than the one the UL grant is sent on, it may not be possible to transmit CSI-RS in the very first subframe after the eNB has occupied the channel due to the very short processing time available between the successful LBT on the carrier for which reporting is to be done and the transmission time of the UL grant on a different carrier. If, however, the subframe is a later subframe within the eNB's TxOP, the eNB can have more processing time to indicate the presence of the CSI-RS on the SCell that the UL Grant is sent on.

The CSI-RS framework is a UE specific framework, i.e., a specific UE is not aware of other UEs CSI-RS. Furthermore, the CSI-RS are configured currently by a specific periodicity and offset. In addition there are three CSI processes defined for CSI measurements.

Per CSI process, the UE would need to be configured with a rather short periodicity of CSI-RS as the eNB can not guarantee to succeed with LBT for a longer periodicity based CSI-RS configuration. More specifically there is a relationship between the TxOP used by the eNB and the CSI-RS configuration. If the periodicity of the CSI-RS can ensure that a single CSI-RS occasion is within a TxOP that the eNB operates, the CSI-RS can occur at any time occasion within the TxOP. If the CSI-RS occurs in the first subframe and potentially second subframe of the TxOP, it could be difficult for the eNB to be able to indicate accurately that the CSI-RS is present on any other carrier than on the same carrier as the UL Grant is sent on, due to processing delay. In that sense, it would be easier to operate CSI-RS configurations if at least two CSI-RS occasions occur within a single TxOP occasion, with a maximum difference in time between them. This ensures that there is always a CSI-RS resource occasion that is possible for the eNB to indicate to the UE to measure on. The currently defined CSI-RS periodicities are 5, 10, 20, 40 and 80 ms. The mainly considered TxOP values in the LAA design are currently 4 and 10 ms. A CSI-RS with a periodicity of 5 ms can be supported with a TxOP of 10 ms. This assumes that the CSI-RS can occur in any subframe within the TxOP. It is worth noting here that DwPTS does not support CSI-RS configurations so that, if the last DL subframe is corresponding to a DwPTS subframe, a CSI-RS configuration for such a subframe needs to be defined. For a TxOP of 4 ms, a new tighter periodicity of CSI-RS needs to be introduced. This is to ensure the presence of two CSI-RS occasions within the TxOP. For the case of only having a single CSI-RS occasion within a 4 ms TxOP, a 4 ms periodicity is sufficient and for double CSI-RS occasion 2 ms periodicity is required. To simplify the eNB processing it is proposed to allow that there are at least two CSI-RS occasions within the applicable TxOP for LAA.

Accordingly, in some embodiments, a CSI-RS periodicity of 2 ms may be introduced. Given that there are multiple CSI-RS occasions within the TxOP either of the above two discussed solutions for indicating the presence of the CSI-RS are possible. It is noted that the first approach is based on a specific RNTI that is broadcast and the second approach is based on the eNB transmitting an UL Grant per UE. The first solution would need the use of a common search to indicate the message, which is a limited resource. The second approach however, assumes that the number of scheduled UEs is rather low. The last assumption is motivated by the LAA SCell being a small cell, which means that is generally not serving as many UEs as a macro cell.

In an embodiment, the presence of CSI-RS is indicated by a UL grant triggering an aperiodic CSI report for the indicated SCell. The other component of the CSI measurement is the interference measurement. To accurately represent the interference conditions when data is transmitted to the UE, it would be beneficial for the interference to be measured on CSI inteference measurement (CSI-IM) when the serving SCell is transmitting. The simplest approach is that the interference is measured on CSI-IM resources at the same time when the UE performs measurements on the CSI-RS.

In an embodiment, the UE can conduct interference measurements for the purpose of CSI reporting on CSI-IM resource in the same time occasions as the UE does measurements on CSI-RS. There is a risk that two different transmitting entities, either eNB, UEs, ST or APs collide over the air and both grab the channel. If the UE would in such an occasion measure on a CSI-RS and CSI-IM, the measurement would be very noisy and not represent the general conditions of the channel. Within the current LTE design, it is allowed for the UE to average CSI-RS and CSI-IM measurement across different CSI-RS and CSI-IM occasions. If this occurs in the above situation, the measurement error will propagate in time and would not correspond to the actual CSI at the time of a successful transmission. It may therefore be preferred to limit CSI-RS and CSI-IM measurements to a single CSI-RS and CSI-IM occasion and not allow averaging over time. Accordingly, an embodiment may include CSI-RS and CSI-IM measurements that are only based on one CSI-RS and CSI-IM occasion.

In sum, various embodiments may include: LAA SCells that do not support periodic CSI reports, but do support aperiodic CSI reports; introduce a CSI-RS periodicity of 2 ms; the presence of CSI-RS is indicated by a UL grant triggering an aperiodic CSI report for the indicated SCell; there is no need to change the CSI-IM resource handling; and CSI-RS measurements are only based on one CSI-RS occasion.

LBT for LAA UL Transmissions

Different options may be considered for accessing unlicensed spectrum for LAA uplink transmissions. Moreover, we discuss the necessity to consider joint designing of the DL and UL LBT algorithms. This description is about the DL and UL LBT dependency.

Frame Based or Load Based LBT for Uplink Transmission

It has been discussed that the load-based CCA procedure is not only very similar to the Wi-Fi physical medium sensing procedure, but also provides flexible spectrum utilization and adaptability to traffic load. Therefore, it is recommended that the LBT procedure for LAA be designed based on the load-based procedure both for UL and DL transmission. Focusing more on the uplink, the frame based LBT may appear to benefit the UE with power saving and reduced complexity due to the fixed CCA time. However, the load based LBT is also capable of providing such benefits without compromising transmission efficiency due to its flexibility in accessing the channel as opposed to the frame based LBT procedure with its rigid structure. The fact that the UE is aware of its uplink grant 4 ms prior to its corresponding scheduled subframe may provide enough time for the UE to choose a reasonable starting point of CCA.

Also, having the load based LBT approach does not impose unnecessary constraints on the eNB to schedule the UEs for the uplink traffic with consideration to the CCA time as a function of the total transmission duration depending on the number of subframes the UE is scheduled for as in the case of the frame based approach. The load based LBT provides more flexibility in the scheduler to better adapt to uplink traffic load by making the start points of CCA more flexible. Moreover, UE power saving can be achieved by allowing defer periods in channel sensing when the medium is observed to be occupied. For example, a UE that is scheduled for two consecutive subframes starts CCA close to the subframe boundary of the first scheduled subframe. If it fails to succeed in load based LBT for that subframe, the UE can defer and continue sensing close to the next subframe boundary and save power. Note that introducing defer periods can also ensure better coexistence with Wi-Fi.

Accordingly, an embodiment includes, when an LBT procedure is used for uplink transmission in LAA, using ETSI rules defined for Load Based Equipment as a starting point.

Mandatory or Optional LBT for Uplink Transmission:

Enforcing LBT when it comes to uplink transmissions in LAA has been discussed. One embodiment includes a default approach where each UE has to perform LBT to be permitted for its uplink transmission. Although this approach seems reasonable regarding the basic principles of accessing the unlicensed band, it might be possible to relax some of the requirements on UEs to perform LBT prior to uplink transmission without resulting in any unfair exploitation of the unlicensed channel with respect to other transmitting nodes. For example, the number of UEs doing LBT can be probably reduced in a group of UEs that are located close enough to each other and experience similar observed interference. The possible advantages could be improved UE power saving and possibly more efficient transmission by avoiding unnecessary LBT attempts. Moreover, there have been further discussions on relaxing all the UEs on performing LBT for example by sharing the corresponding eNB channel access for uplink transmissions.

Moreover, the discussion of DL+UL LAA is starting and there is considerable range of uncertainty at this point. Note that UL transmission in LTE is not autonomous from the UE side but is controlled and scheduled by the eNB. Hence, in the case of self-scheduling, UL transmissions can happen only if the LAA eNB gain channel access first. Consider the scenario where the LAA network (with 1 LAA eNB+N LAA UEs) is operating on the channel with a Wi-Fi network (with 1 Wi-Fi AP+N Wi-Fi stations). Two first-order considerations are made. First, if the LAA eNB can only gain channel access share on the order of 1/N, the scheduled UEs following similar LBT algorithms will gain channel access on the order of 1/N. The net channel access share of the LAA UEs is then $1/N^2$. This type of solution may not achieve a fair sharing of the DL+UL operations for the LAA network. Second, if the LAA eNB can gain channel access share on the order close to 1/2, the scheduled UE can adopt an LBT algorithm such that they will gain channel access on the order of 1/N. The net channel access share of the LAA UEs is then 1/2N.

With the above considerations, it is recognized that the LBT attempts at UE for LAA uplink transmissions could be considered mandatory for all UEs, optional for some of the UEs or not required for any of the UEs. Each of the three alternatives differently impact UE power saving and transmission efficiency. In the LTE protocol, UL transmissions are controlled by the eNB through UL grants given to individual UEs.

Accordingly, in some cases, there may be three alternatives for uplink LBT: 1) LBT mandatory for all UEs; 2) LBT optional for some UEs; and 3) LBT not required for all UEs. Uplink LBT should consider the dependency of LTE UL transmissions to DL transmissions through UL grants. In some cases, UL LBT should ensure that the eNB and its serving UEs would benefit a fair sharing of the spectrum in spite of the dependency of LTE UL transmissions to DL transmissions through UL grants.

In sum, potential alternatives for performing LBT at UE side for the LAA uplink transmission are considered. In some embodiments, when an LBT procedure is used for uplink transmission in LAA, ETSI rules defined for Load Based Equipment are considered as a starting point. In some cases, the LBT attempts at UE for LAA uplink transmissions could be considered mandatory for all UEs, optional for some of the UEs or not required for any of the UEs. Each of the three alternatives differently impacts UE power saving and transmission efficiency. In the LTE protocol, UL transmissions may be controlled by the eNB through UL grants given to individual UEs. Three alternatives for uplink LBT may include LBT mandatory for all UEs, LBT optional for some UEs and LBT not required for any of the UEs. Uplink LBT should consider the dependency of LTE UL transmissions to DL transmissions through UL grants. UL LBT may ensure that the eNB and its serving UEs would benefit a fair sharing of the spectrum in spite of the dependency of LTE UL transmissions to DL transmissions through UL grants.

LBT for LAA DL Transmissions

Detailed solutions for the LBT phase in LAA have been discussed in order to ensure fair coexistence with Wi-Fi and other LAA services as well as compliance with regulatory requirements. Here, further details for design of LBT in the downlink for LAA are considered.

Regarding LBT design in DL for LAA, the benefits of a load-based LBT scheme were discussed due to its flexible spectrum utilization and adaptability to traffic load and proposed an LBT protocol, which ensures fair coexistence with other technologies in particular Wi-Fi in the unlicensed spectrum. In some LBT protocol embodiments with additional coexistence measures, additional deferring after sensing an occupied channel and before post-transmission random backoff are added to the EN 301.893 generic load-based LBT procedure to enable better coexistence behavior with Wi-Fi and LAA. The modification provides a means to randomize LAA data transmissions.

Figure 26:
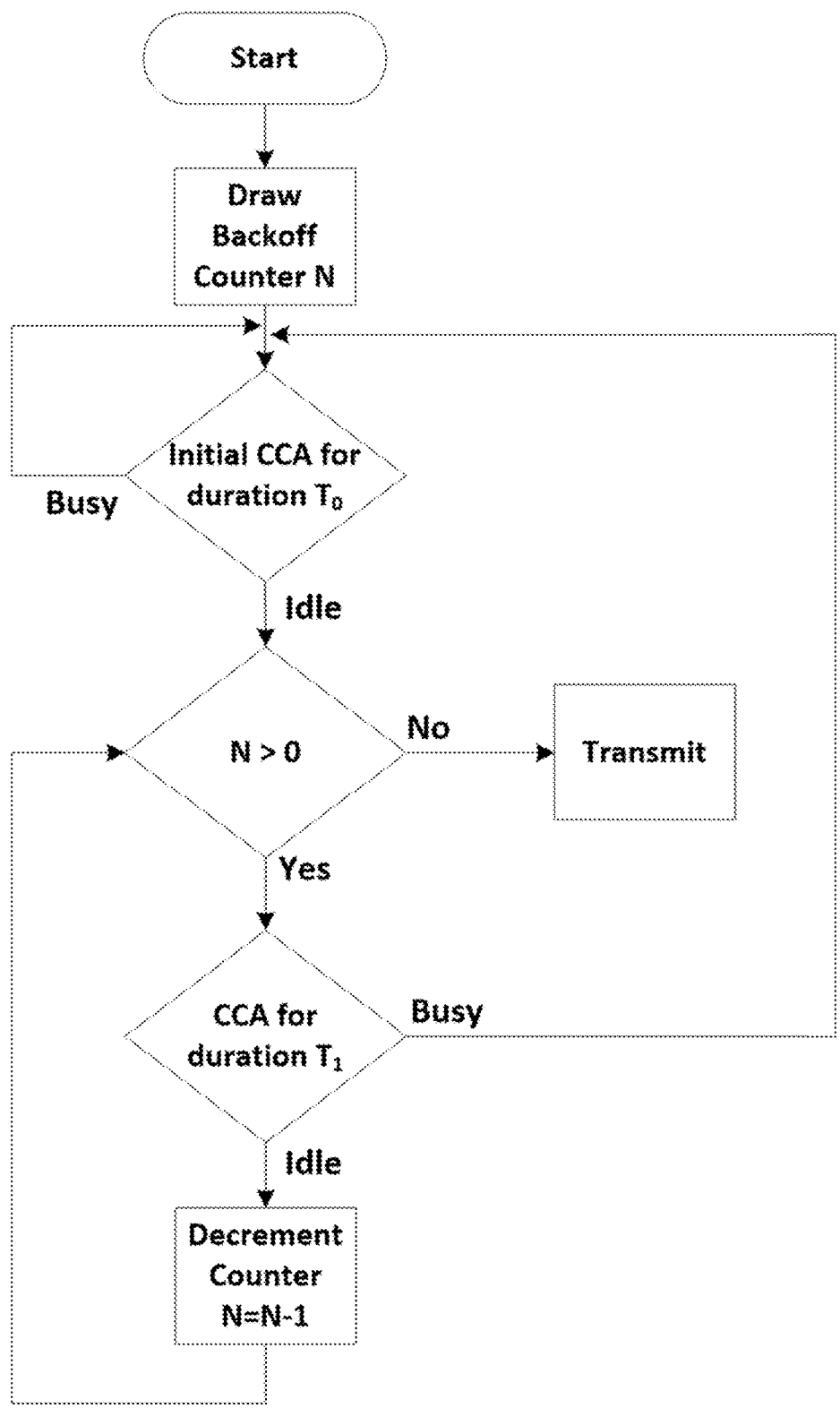
FIG. 26 is a flowchart illustrating an overview of an example LBT procedure for LAA.

In some embodiments, the following LAA LBT procedure is used. As illustrated with a flow chart in FIG. 26, a random backoff counter, N, is always drawn to start the LBT procedure. An initial CCA is immediately followed by an extended CCA stage. For example, an initial CCA is performed for duration $T_0$ and continued if busy. If the carrier is found to be idle and if N is not greater than 0, transmission is performed. If N is greater than 0, CCA is performed for duration $T_1$. If busy, CCA is performed again with duration $T_0$. If idle, the N counter is decremented and it is determined whether N is greater than 0. If not, transmission occurs. If N is still greater than 0, CCA is performed again for duration $T_1$.

In other words, a successful transmission leads to a restart of the LBT procedure with a newly drawn random backoff counter, N. This ensures that a defer period and a post-transmission random backoff with extended CCA is employed after the end of every transmission burst. Defer periods are incorporated by freezing the backoff counter and deferring back to the initial CCA when the channel is observed to be occupied during the extended CCA.

Some features may be adjusted to enhance the flexibility and efficiency of the LBT protocol with consideration to at least the following objectives: reducing UE complexity and power consumption; reducing overhead; imposing minimum standardization impact; and reducing collision and avoiding channel access starvation.

Regarding freeze periods during a load-based LBT procedure, the starting time instance of the LBT procedure at eNB can be flexible and when eNB is permitted to access the channel it can transmit signals. However, the eNB can be configured to consider time periods during the LBT procedure where no transmission can be initiated within. These time periods can be referred to as "the freeze periods" for simplicity. The initiation of transmission due to the successful LBT can be hence occurred only outside these time intervals.

Configuring freeze periods at eNB during the LBT procedure enhances the corresponding UEs power saving due to the fact that those UEs are not expecting any possible transmission during the freeze periods, since the eNB remains idle during the freeze periods. Moreover, it reduces the overhead due to the possible transmission of the initial/reservation signals. Additionally, this feature increases the opportunities for other contending nodes in the medium to access the channel in an effective manner which can serve a purpose similar to the exponential backoff feature in Wi-Fi technology.

Moreover, the eNB can be configured to have a limited time budget for the CCA operation in the LBT procedure. As an example, the EN ETSI 301.893 generic load-based LBT regulation implies that a contention window of 10 is large enough to fulfil a maximum channel occupancy of 4 ms. This means that for the LBT with a CCA slot of 20 μs, if the largest random backoff number is drawn, a time budget of about 3 OFDM symbols (OS) is required for the LBT to declare success if the channel is idle.

Figure 27:
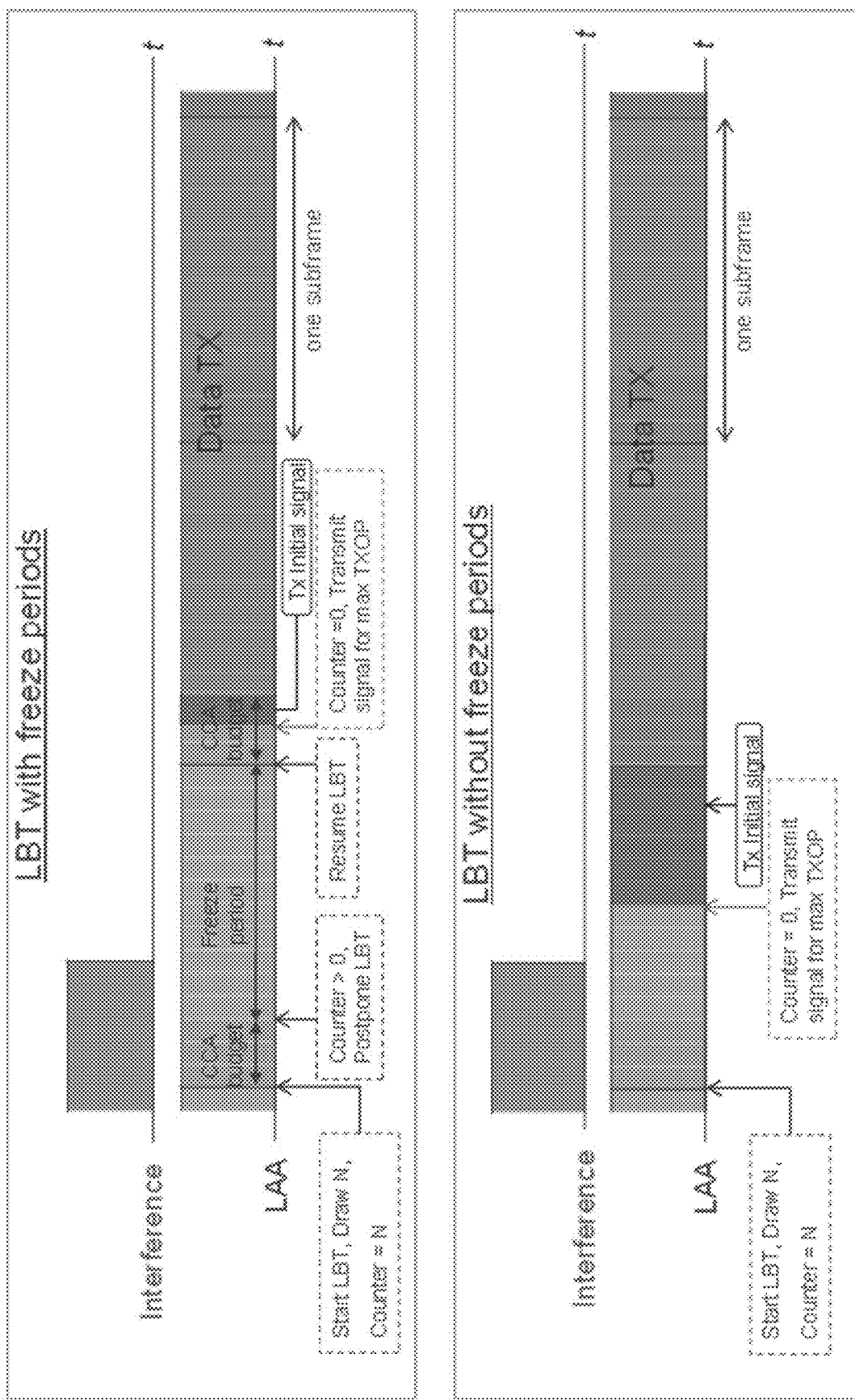
FIG. 27 is a diagram illustrating an example of an LBT protocol with or without freeze periods in a medium load scenario.
Figure 28:
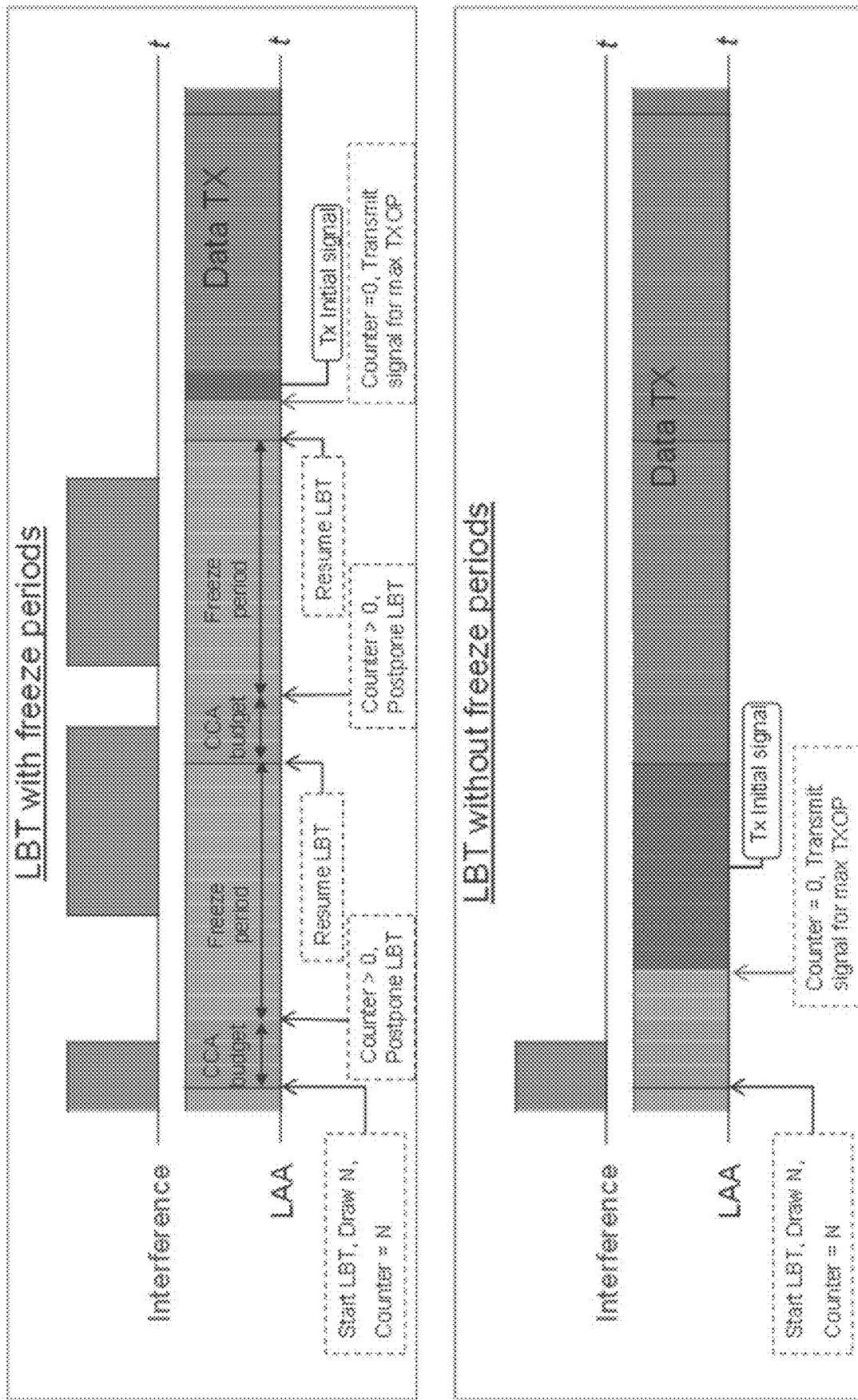
FIG. 28 is a diagram illustrating an example of an LBT protocol with or without freeze periods in a heavily occupied medium.

FIGS. 27 and 28 show some illustrative examples of how configuration of freeze periods and limited CCA budget would impact the LBT procedure, according to some embodiments. The examples provided in these figures show that there is a trade-off between the level of politeness and the overhead with configuration of the freeze periods. The larger the freeze periods, the more polite the LBT protocol is towards other systems and the smaller the overhead due to the potential initial/reservation signals. However, it is important to keep in mind that freeze periods should not result in starving an eNB by being completely disadvantaged in accessing the channel as compare to the other nodes. In other words, this feature is applicable when the system is operating in a stable point, otherwise reducing or discarding the freeze period is preferable. FIG. 27 illustrates an LBT protocol with or without freeze periods in a medium load scenario. FIG. 28 illustrates some examples of self-scheduling on SCell for LAA eNBs with the constraint of 4 ms maximum channel occupancy time.

Fixed OS candidates may be used to initiate data transmission after a successful LBT procedure. Moreover, fixed candidates for initiating the data transmission can reduce the complexity at the UE side where the data would be expected to start arriving in limited time instances.

In the following, corresponding approaches are considered to support EPDCCH and PDCCH self-scheduling. The UE can be configured with either self-scheduling or cross-carrier scheduling. For efficient operations on LAA, self-scheduling has higher importance for being supported since it reduces the scheduling load on the PCell. Moreover, cross-carrier scheduling can have challenges due to the very short delay between the LBT result on the SCell and the scheduling command on the PCell, and cross-carrier scheduling can impose scheduling limitations if the scheduling cell is operating TDD.

Figure 29:
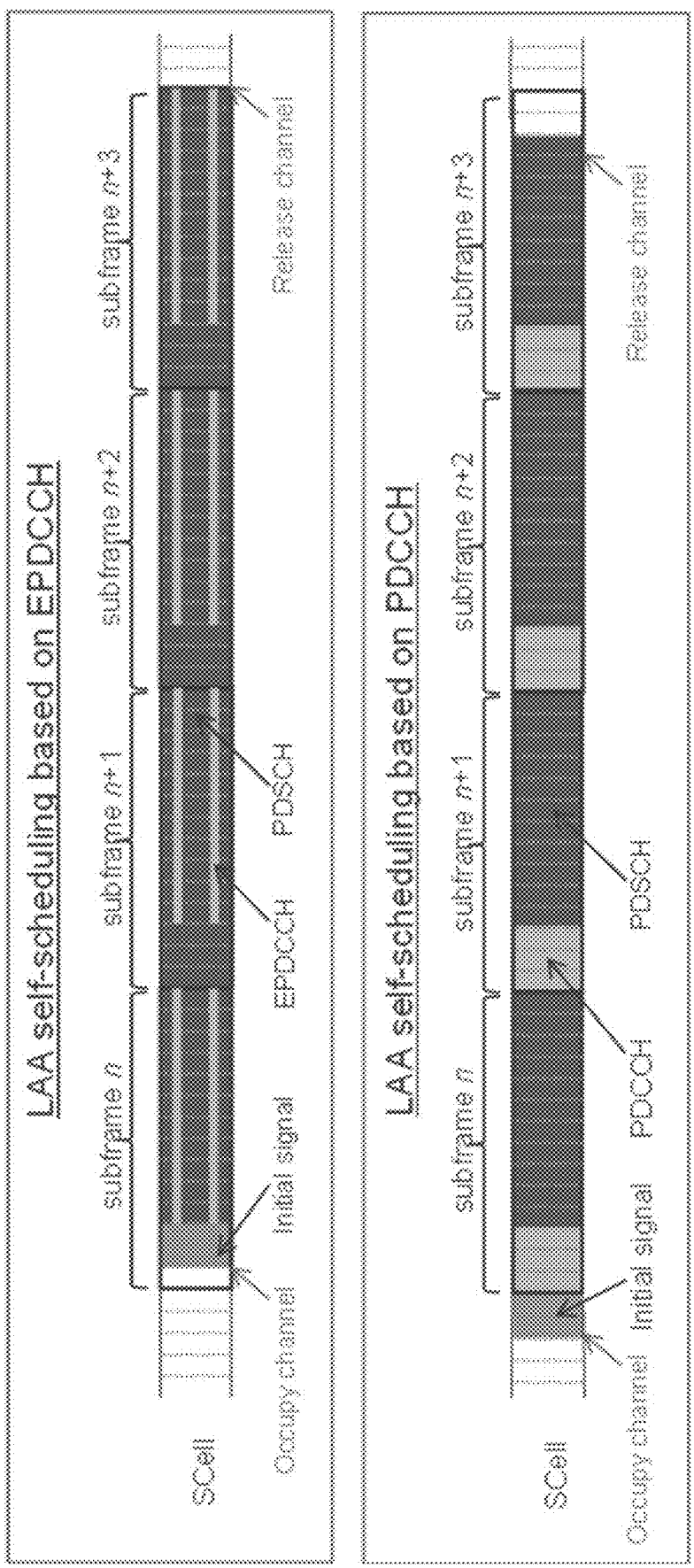
FIG. 29 is a diagram illustrating examples of LAA self-scheduling on the SCell with maximum channel occupancy of 4 ms.

In some embodiments, to support self-scheduling with EPDCCH on the LAA SCell, EPDCCH resources should be configured for the SCell. To reduce the UEs complexity, the UE may be configured with one fixed candidate for the EPDCCH starting OS which already exists in the standard. The proper choice of the EPDCCH starting OS depends on the operating point of the LBT protocol. The example in FIG. 29 shows that the EPDCCH always start in OS #3 irrespective of where the subframe is located in a transmission burst based on the CCA time budget of 3 OFDM symbols that was discussed earlier. As shown in this figure, there are only two OS candidates for PDSCH starting symbols, being OS #0 and OS #3. A new field may be needed in the DCI to indicate to the UE whether the subframe is a normal subframe (with PDSCH occupying all 14 OS) or a shortened subframe (with DPSCH occupying 11 OS starting at OS #3). From the UE's point of view, the UE checks its allocated EPDCCH search space(s) when it is not in DRX. When CRC checks for a searched EPDCCH candidate, the UE can follow the DCI to correctly decode the PDSCH transmission.

In some cases, to support self-scheduling with PDCCH on the LAA SCell, only OS #0 can be considered for starting the data transmission to reduce the impact on the PDDCH. However, this implies that in order to release the channel as late as possible, the last subframe has to be shortened at the end that would impact demodulation reference signals (DMRS) and some CSI-RS configurations. Moreover, that subframe from the UE side should be configured differently than other subframes and use a similar structure as downlink pilot time slot (DwPTS), where the last OFDM symbol with CRS may not be available. FIG. 28 illustrates some examples of self-scheduling on SCell for LAA eNBs with the constraint of 4 ms maximum channel occupancy time. For example, the LBT protocol may be with or without freeze periods in a heavily occupied medium.

However, support of DMRS-based transmission modes may be preferred as compared to the CRS-based transmission modes. This is motivated by the fact that in the context of discontinuous transmission on the LAA SCell, the legacy CRS does not exist as in previous releases. In fact, the CRS can be present only in the subframes that transmission is allowed. Due the unpredictable nature of the unlicensed band there is no guarantee for the existence of CRS even if enhanced International Mobile Telecommunications Advanced (eIMTA) frame work is adopted for LAA. Therefore, the standardization impact in particular on the tests procedures and requirements in RAN4 in relation to non-always available CRS may be significant. This statement holds even if DRS frame work or TDD configuration 0 are considered as a starting point since all rely on the periodicity of the CRS but less frequent. The situation for DMRS based transmission is different since DMRS is present only when data is present. Hence no changes in the specifications are needed as compared to CRS but perhaps some new requirements are needed to specify.

Figure 30:
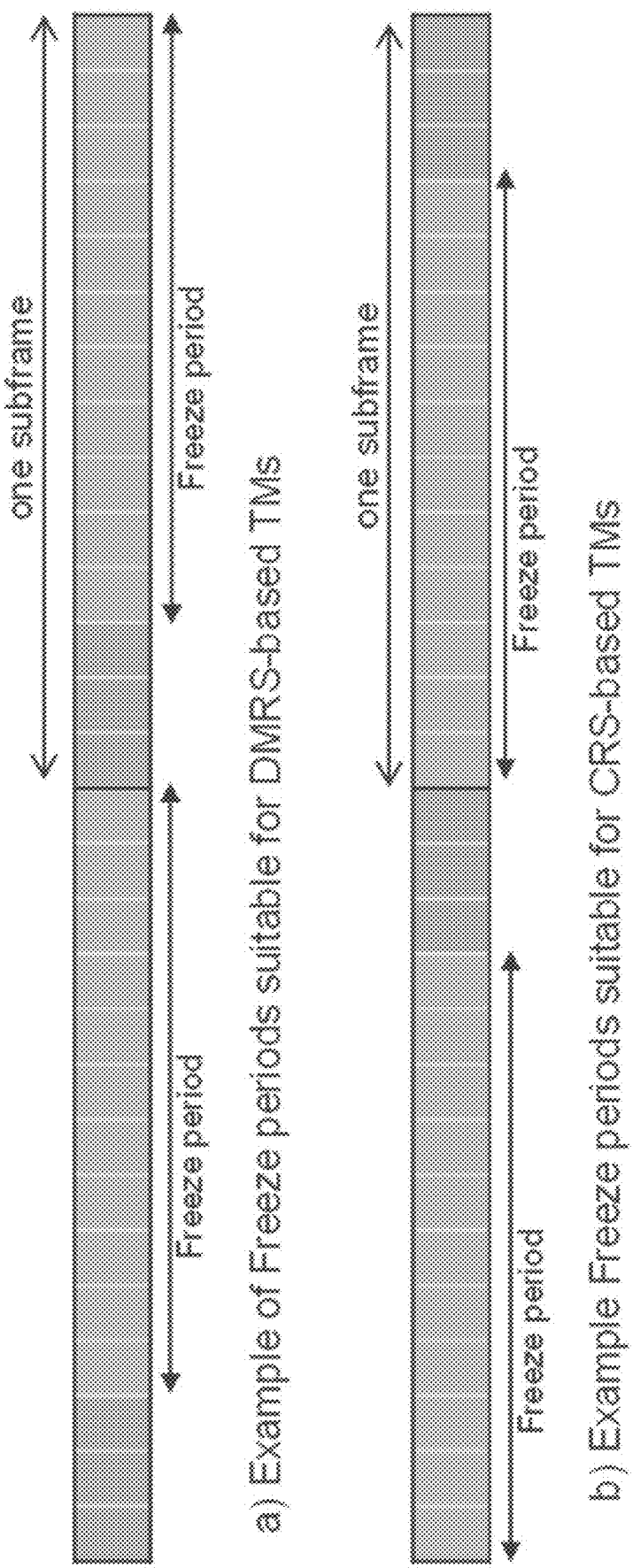
FIG. 30 is a diagram illustrating an examples of freeze periods to support different TMs.

Having said that, the freeze period feature is in general applicable to support both DMRS based or CRS based transmissions, as shown in FIG. 30. Accordingly, in some embodiments, freeze periods during the LBT procedure may be configured at the eNB where the UE does not expect any signal form eNB is supported. Self-scheduling may be based on EPDCCH should be considered for LAA SCells. For DMRS-based transmission the UE may be configured with one of the four candidates of the EPDCCH starting. A candidate with an offset from the subframe boundary may be preferred. A maximum channel occupancy of 4 ms may suggest OS #3 as the starting symbol for EPDCCH. FIG. 29 illustrates examples on LAA self-scheduling on the SCell with maximum channel occupancy of 4 ms. A new control bit in the DCI message may indicate to the UE starting point of the PDSCH. The default may be a choice between two alternatives of OS #0 and OS #3.

Prioritized Channel Access

In some embodiments, a Wi-Fi enhanced distributed channel access (EDCA) mechanism defines four access categories (ACs) to support prioritized quality of service (QoS). Each AC is characterized by specific values for a set of access parameters that statistically prioritize channel access for one AC over another.

Figure 31:
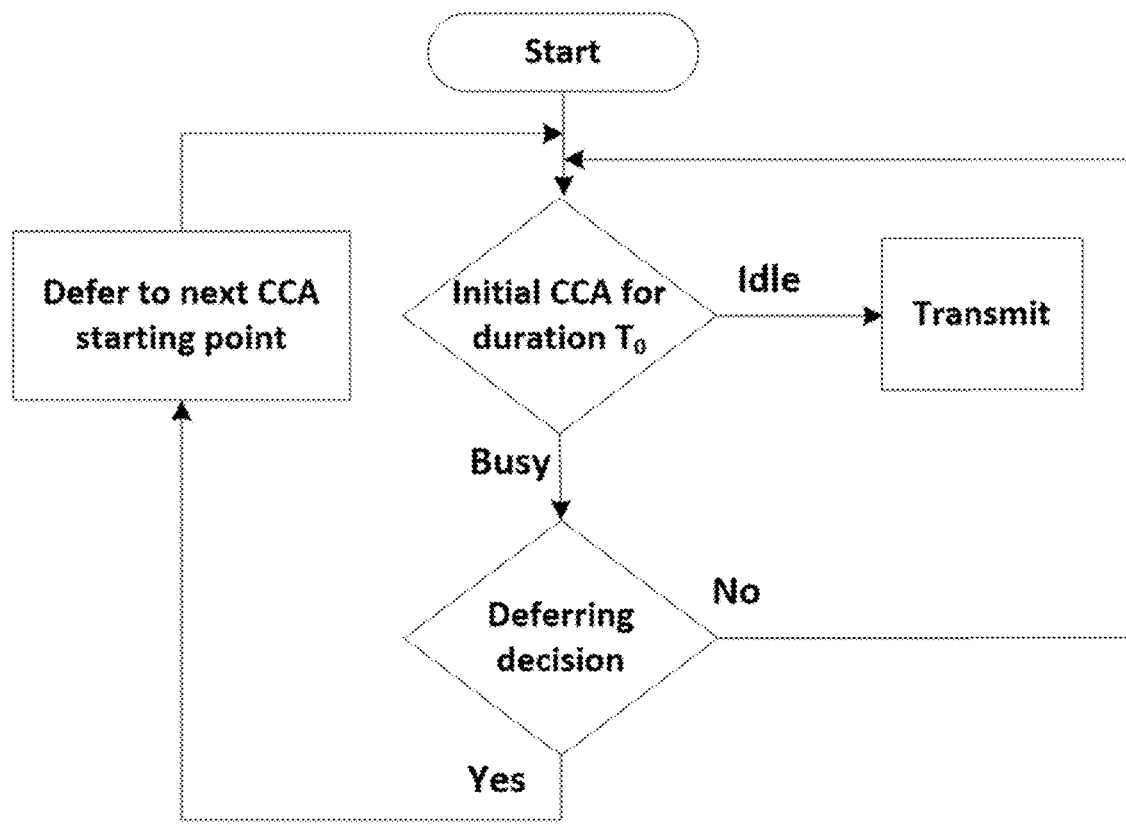
FIG. 31 is a flowchart illustrating an example LBT for management and control information.

In LAA, a similar prioritization of channel access could be defined. One option is to apply different LBT categories to prioritize channel access for different channels and signals, or support data with different QoS requirements in LAA. For example, it would be beneficial to have a prioritized channel access for management and control information over data traffic in LAA. Examples of management and control information can be Discovery Reference Signal (DRS) transmissions, or Master Information Block (MIB) and/or System Information Block (SIB) signals, etc. A different LBT scheme than the LBT procedure proposed in FIG. 26 can be applied for channel access of management and control information, as shown in FIG. 31.

The transmissions can commence immediately after the initial CCA is cleared. If the channel is determined to be busy during an initial CCA, the commencement of the next CCA is conditionally deferred to the next CCA starting point. Therefore, the management and control information could have a prioritized channel access and have higher probability to be transmitted at the predetermined time instances, which could be especially beneficial for DRS transmission and in turn would facilitate and simplify the DRS reception on UE side.

Another option is to apply different LBT parameters to prioritize channel access for different channels and signals, or support data with different QoS requirements in LAA. The channel access may be prioritized/deprioritized using different LBT parameter settings, such as the CCA duration, freeze periods, contention window sizes, etc. For the channels or signals with a prioritized channel access, for example, with a smaller contention window size, the maximum channel occupancy time can be decreased to maintain a fair coexistence. Accordingly, in embodiment may include supporting prioritized channel access in LAA by, for example, applying different LBT categories, and/or different LBT parameters, etc. For prioritized channel access, the channel/signal with prioritized access should be determined and specified. One example is that DRS should have a prioritized channel access over other transmissions in DL. Moreover, the LBT scheme and LBT parameters need to be specified for the prioritized channel/signal.

In sum, further details on DL LBT in LAA were explained and some embodiments may include the following in the LBT procedure for LAA data transmissions: a random backoff counter, N, is always drawn to start the LBT procedure; an initial CCA is always immediately followed by an extended CCA stage; a successful transmission always leads to a restart of the LBT procedure with a newly drawn random backoff counter, N. This may ensure that a defer period and a post-transmission random backoff with extended CCA is employed after the end of every transmission burst. Defer periods may be incorporated by freezing the backoff counter and deferring back to the initial CCA when the channel is observed to be occupied during the extended CCA. Freeze periods during the LBT procedure may be configured at the eNB where the UE does not expect any signal from the eNB. Self-scheduling may be based on EPDCCH should be considered for LAA SCells. For DMRS-based transmission, the UE may be configured with one of the four candidates of the EPDCCH starting. A candidate may include an offset from the subframe boundary. Maximum channel occupancy of 4 ms may suggests OS #3 as starting symbol for EPDCCH. A new control bit in the DCI message may indicate to the UE starting point of the PDSCH. The default may be a choice between two alternatives of OS #0 and OS #3. Prioritized channel access may be supported in LAA, for example, by applying different LBT categories, and/or different LBT parameters, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed at a wireless device, the wireless device being connected to a first cell and a second cell, the method comprising:
   transmitting an uplink message in the second cell, responsive to receiving a scheduling grant in the first cell; and
   receiving downlink data in the second cell, responsive to receiving a scheduling command in the second cell.

2. The method of claim 1, the method further comprising, prior to said transmitting and receiving, receiving one or more configuration messages indicating that downlink transmissions on the second cell are to be scheduled using self-scheduling on the second cell and indicating that uplink transmissions on the second cell are to be scheduled using cross-carrier scheduling on the first cell.

3. The method of claim 1, wherein the second cell is configured on a carrier where a listen-before-talk (LBT) protocol for transmission is required to be used, the method comprising:
   receiving the scheduling grant in the first cell;
   in a subframe occurring a predetermined number of subframes after receiving the scheduling grant, performing a clear channel assessment (CCA) in the second cell; and
   transmitting the uplink message responsive to success of the CCA.

4. The method of claim 1, wherein the second cell is configured on a carrier where a listen-before-talk (LBT) protocol for transmission is required to be used, the method comprising:
   receiving the scheduling grant in the first cell;
   receiving, after receiving the scheduling grant, a grant confirmation signal indicating that a network node has performed a clear channel assessment (CCA) on the carrier and is releasing the carrier for the wireless device; and
   transmitting the uplink message responsive to receiving the scheduling grant and the grant confirmation signal.

5. The method of claim 4, wherein the method comprises receiving the grant confirmation signal in, or subsequent to, the subframe before the first scheduled subframe according to the scheduling grant.

6. A method performed at a network node, the network node serving a first cell and a second cell, the method comprising:
   transmitting a scheduling grant to the wireless device in the first cell;
   receiving an uplink message from the wireless device in the second cell, according to the transmitted scheduling grant;
   transmitting a scheduling command to the wireless device in the second cell; and
   transmitting downlink data to the wireless device in the second cell, according to the transmitted scheduling command.

7. The method of claim 6, wherein the second cell is configured on a carrier where a listen-before-talk (LBT) protocol for transmission is required to be used.

8. The method of claim 6, wherein the method comprises transmitting, to the wireless device, one or more configuration messages indicating that downlink transmissions on the second cell are to be scheduled using self-scheduling on the second cell and indicating that uplink transmissions on the second cell are to be scheduled using cross-carrier scheduling on the first cell.

9. A wireless device configured to be connectable to a first cell and a second cell, the wireless device comprising:
   radio circuitry; and
   processing circuitry operatively coupled to the radio circuitry, wherein the processing circuitry is configured to control the wireless device to:
      transmit an uplink message in the second cell, responsive to receiving a scheduling grant in the first cell; and
      receive downlink data in the second cell, responsive to receiving a scheduling command in the second cell.

10. The wireless device of claim 9, wherein the processing circuitry is further configured to control the wireless device to, prior to said transmitting and receiving, receive one or more configuration messages indicating that downlink transmissions on the second cell are to be scheduled using self-scheduling on the second cell and indicating that uplink transmissions on the second cell are to be scheduled using cross-carrier scheduling on the first cell.

11. The wireless device of claim 9, wherein the second cell is configured on a carrier where a listen-before-talk (LBT) protocol for transmission is required to be used and wherein the processing circuitry is further configured to control the wireless device to:
   receive the scheduling grant in the first cell;

in a subframe occurring a predetermined number of subframes after receiving the scheduling grant, perform a clear channel assessment (CCA) in the second cell; and transmit the uplink message responsive to success of the CCA.

12. The wireless device of claim 9, wherein the second cell is configured on a carrier where a listen-before-talk (LBT) protocol for transmission is required to be used and wherein the processing circuitry is further configured to control the wireless device to:

receive the scheduling grant in the first cell;

receive, after receiving the scheduling grant, a grant confirmation signal indicating that a network node has performed a clear channel assessment (CCA) on the carrier and is releasing the carrier for the wireless device; and transmit the uplink message responsive to receiving the scheduling grant and the grant confirmation signal.

13. The wireless device of claim 12, wherein the processing circuitry is configured to control the wireless device to receive the grant confirmation signal in, or subsequent to, the subframe before the first scheduled subframe according to the scheduling grant.

14. A network node configured to serve a first cell and a second cell, wherein the network node comprises:

radio circuitry; and processing circuitry operatively coupled to the radio circuitry, wherein the processing circuitry is configured to control the network node to:

transmit a scheduling grant to the wireless device in the first cell;

receive an uplink message from the wireless device in the second cell, according to the transmitted scheduling grant;

transmit a scheduling command to the wireless device in the second cell; and transmit downlink data to the wireless device in the second cell, according to the transmitted scheduling command.

15. The network node of claim 14, wherein the second cell is configured on a carrier where a listen-before-talk (LBT) protocol for transmission is required to be used.

16. The network node of claim 14, wherein the processing circuitry is configured to control the network node to transmit, to the wireless device, one or more configuration messages indicating that downlink transmissions on the second cell are to be scheduled using self-scheduling on the second cell and indicating that uplink transmissions on the second cell are to be scheduled using cross-carrier scheduling on the first cell.

* * * * *